US012767024B1

(12) United States Patent
Long

(10) Patent No.: US 12,767,024 B1
(45) Date of Patent: Oct. 20, 2026

(54) VEHICLE HEADREST WITH SIDE WINGS

(71) Applicant: Jilu Long, Shaoyang (CN)

(72) Inventor: Jilu Long, Shaoyang (CN)

(*) Notice: Subject to any disclaimer, the term of this patent is extended or adjusted under 35 U.S.C. 154(b) by 0 days.

(21) Appl. No.: 19/432,968

(22) Filed: Dec. 25, 2025

(51) Int. Cl.
*B60N 2/882* (2018.01)
*B60N 2/885* (2018.01)
*B60N 2/80* (2018.01)

(52) U.S. Cl.
CPC ............. *B60N 2/885* (2018.02); *B60N 2/882* (2018.02); *B60N 2002/899* (2018.02)

(58) Field of Classification Search
CPC ................................ B60N 2/885; B60N 2/882
See application file for complete search history.

(56) References Cited

U.S. PATENT DOCUMENTS 7,093,903 B2 * 8/2006 O'Connor .............. B60N 2/885 5/636
9,701,231 B2 * 7/2017 Arriola .................. B60N 2/882
10,875,464 B1 * 12/2020 Tsao ........................ B60R 11/00
11,285,852 B2 * 3/2022 Long ...................... B60N 2/986
11,618,362 B1 * 4/2023 Yang ...................... B60N 2/838 296/1.07
11,648,860 B2 * 5/2023 Zhou ...................... B60N 2/897 297/404
12,427,900 B2 * 9/2025 Zhou ...................... B60N 2/885
12,434,842 B2 * 10/2025 Kash ...................... B60N 2/885
2023/0391241 A1 * 12/2023 Millan .................. B60N 2/809
2026/0001467 A1 * 1/2026 Choi ...................... B60N 2/806

FOREIGN PATENT DOCUMENTS

CN 212195197 U * 12/2020 ............. B60N 2/882
CN 112977215 A * 6/2021 ............. B60N 2/806
CN 216331626 U * 4/2022 ............. B60N 2/885
CN 119567984 A * 3/2025 ............. B60N 2/841
DE 202023105135 U1 * 9/2023 ............. B60N 2/885
KR 102429571 B1 * 8/2022 ............... B60N 2/90
KR 20230144370 A * 10/2023 ............. B60N 2/885

* cited by examiner

*Primary Examiner* — Timothy J Brindley

(57) ABSTRACT

A vehicle headrest with side wings includes a headrest, where a connecting bracket is disposed inside the headrest, the connecting bracket extends out of the headrest toward two opposite sides and forms connecting portions, and the headrest is configured to support a human head; at least two oppositely disposed side wing assemblies, where the two side wing assemblies are detachably and rotatably connected to the connecting portions of the headrest, the side wing assemblies are configured to support both sides of the human head; and a fixing mechanism, where the fixing mechanism is detachably connected or fixedly connected to the headrest and configured to fix the headrest and the side wing assemblies to a vehicle seat.

13 Claims, 23 Drawing Sheets

VEHICLE HEADREST WITH SIDE WINGS

TECHNICAL FIELD

The present disclosure relates to the technical field of vehicle headrests, and in particular to, a vehicle headrest with side wings.

BACKGROUND

A vehicle headrest is a device mounted on a vehicle seat and configured to support a human head. The vehicle headrest provides a very good experience for drivers and passengers during long-distance traveling and is deeply favored by users.

However, a common vehicle headrest does not have the functions of the side wing. For example, when needing support for both sides of the head, a user is required to purchase an additional separate side wing. Both the headrest and the side wing need to be mounted and fixed separately, which is very inconvenient and results in a poor user experience. Moreover, the mounting space at the headrest of a vehicle is limited, and the combination of the headrest and the side wings needs to be improved.

SUMMARY

An objective of the present disclosure is to provide a vehicle headrest with side wings, which aims to solve the problems that a headrest in the prior art is single in function and poor in experience, and it is inconvenient to additionally mount the side wings separately.

The present disclosure is implemented as follows:

A vehicle headrest with side wings includes a headrest, where a connecting bracket is disposed inside the headrest, the connecting bracket extends out of the headrest toward two opposite sides and forms connecting portions, and the headrest is configured to support a human head;

- at least two oppositely disposed side wing assemblies, where the two side wing assemblies are detachably and rotatably connected to the connecting portions of the headrest, the side wing assemblies are configured to support both sides of the human head; and
- a fixing mechanism, where the fixing mechanism is detachably connected or fixedly connected to the headrest and configured to fix the headrest and the side wing assemblies to a vehicle seat.

Preferably, the side wing assemblies each include a side wing, a first connecting mechanism, and a second connecting mechanism disposed on the side wing, and the side wing is rotatably connected to the second connecting mechanism and slidably connected to the first connecting mechanism through the second connecting mechanism.

Preferably, the first connecting mechanism includes a support rod, the support rod is integrally an L-shaped structural body, a track hole is formed in the support rod in a length direction of the support rod, a limiting platform is disposed in the track hole, and first teeth are disposed on two opposite sides of the limiting platform.

Preferably, the first connecting mechanism further includes an insertion portion rotatably connected to the support rod, a first elastomer and a first button body that is disposed above the first elastomer are disposed in the insertion portion, the first elastomer is configured to reset the first button body by pressing, the first button body penetrates through a shell of the corresponding insertion portion and is in a protruding state, and a positioning boss is transversely disposed on a surface of the insertion portion.

Preferably, the connecting portion is a tubular structural body, a snap-fit hole is formed in a position corresponding to the first button body on the connecting portion, a positioning groove adapted to the positioning boss is formed in an inner wall of the snap-fit hole, and the side wing assemblies are quickly mounted and detached through cooperation of the first button body and the snap-fit hole.

Preferably, the insertion portion further includes a first damping mechanism, configured to generate a damping effect when the first connecting mechanism rotates.

Preferably, the first damping mechanism includes a bow-shaped member and a second elastomer disposed inside the insertion portion, an insertion cavity is disposed at a position where the support rod and the insertion portion are connected, a plurality of damping grooves are formed in an inner ring of the insertion cavity, a damping platform extending into the damping grooves is disposed at a top of the bow-shaped member, the second elastomer is disposed below the bow-shaped member to elastically support the bow-shaped member, and when the damping platform of the bow-shaped member is snapped into the damping grooves, rotating positions of the side wing assemblies are in a locked state.

Preferably, the second connecting mechanism includes a pedestal, a rotating disc, and a second damping mechanism, the pedestal is embedded into the side wing, a rotating cavity is disposed inside the pedestal, the rotating disc is located in the rotating cavity, and the second damping mechanism is configured to generate a damping effect when the rotating disc rotates;

- a top of the rotating disc extends upward to pass through the track hole in the support rod, a cover plate, a second button body, and a third elastomer are disposed at the top of the rotating disc, the third elastomer is located below the second button body and configured to reset the second button body by pressing, a top of the second button body penetrates through the cover plate, fourth teeth are disposed at positions corresponding to the first teeth on the second button body, the first teeth are engaged with the fourth teeth; when the second button body is pressed, the fourth teeth on the second button body are away from the first teeth, in this case, the second connecting mechanism is in a sliding unlocking state, the second button body is loosened, and under a reset force of the third elastomer, the second button body is reset, and the first teeth are engaged with the fourth teeth to form a locked state of the second connecting mechanism.

Preferably, the second damping mechanism includes second teeth annularly disposed at a bottom of the rotating cavity and third teeth disposed on the rotating disc, and the third teeth and the second teeth are disposed opposite to each other and are engaged with each other.

Preferably, the second damping mechanism includes a plurality of limiting grooves and limiting posts annularly disposed at the bottom of the rotating cavity, and a fourth elastomer, the limiting posts are embedded into the rotating disc, the fourth elastomer is located below the limiting posts to elastically form the limiting posts, and when front ends of the limiting posts are snapped into the limiting grooves, the rotating position of the rotating disc is in a locked state.

Preferably, the fixing mechanism includes a housing, a left clamping arm and a right clamping arm that are slidably disposed on two opposite sides of the housing, and a hook rotatably connected to a rear end of the housing, a fixed cavity is disposed on the connecting bracket, a fixed seat is detachably connected in the fixed cavity, a horizontal bar is fixedly connected to or slidably connected front and back to the fixing mechanism, and a front end of the horizontal bar is rotatably connected to the fixed seat in the fixed cavity.

Preferably, sliding groove bodies with a certain depth are formed in left and right sides of the housing of the fixing mechanism, the left clamping arm and the right clamping arm are both inserted into the corresponding sliding groove bodies and are detachably connected, and the left clamping arm and the right clamping arm are the same in structure.

Preferably, the left clamping arm and the right clamping arm are both J-shaped structural bodies, the left clamping arm and the right clamping arm are disposed in a horizontal direction, and fifth teeth with a certain length are disposed on the left clamping arm and the right clamping arm in a length direction.

Preferably, the fixing mechanism further includes a third button body and a sixth elastomer disposed below the third button body, a top of the third button body penetrates through the corresponding housing and extends out of the housing, sixth teeth are disposed at positions corresponding to the fifth teeth on an upper surface of the third button body, the fifth teeth are engaged with the sixth teeth, and when the corresponding third button body is pressed, the sixth elastomer has compressive deformation, the sixth teeth on the third button body are separated from the fifth teeth, and the left clamping arm and the right clamping arm are in an unlocked state.

Compared with the prior art, the present disclosure has the following beneficial effects:

1. Two side wings are disposed on the headrest to support the head of the user in the left-right direction and from the rear, which provides higher comfort and effectively enhances the user experience;
2. The headrest and the side wing may be mounted and fixed conveniently by only one fixing mechanism;
3. By disposing the second connecting mechanism and the track hole, the side wing connected to the second connecting mechanism may move front and back to adjust the support height of the side wing to fit different heights and meet different requirements of users;
4. By disposing the support rod and the rotatably connected insertion portion, the side wing may rotate front and back in the circumferential direction for adjustment, so as to obtain an optimal support effect on both sides of the face of the user, thereby improving the fit degree to both sides of the face of the user; and
5. By forming the snap-fit hole adapted to the first button body, the side wing assemblies may be detached and mounted quickly.

DETAILED DESCRIPTIONS OF THE EMBODIMENTS

In the present disclosure, unless otherwise explicitly specified and defined, the terms "mounting", "connection", "linkage", and "fixation" should be understood in a broad sense. For example, it may be a fixed connection, a detachable connection, or an integral connection; may be a mechanical connection or an electrical connection; may be a direct connection, or an indirect connection through an intermediate medium; and may be the internal communication between two components or the interaction relationship between two components. For those of ordinary skill in the art, the specific meanings of the above-mentioned terms in the present disclosure can be understood according to specific circumstances.

A further description will be made below in conjunction with the accompanying drawings and specific embodiments:

Embodiment 1

Figure 23:
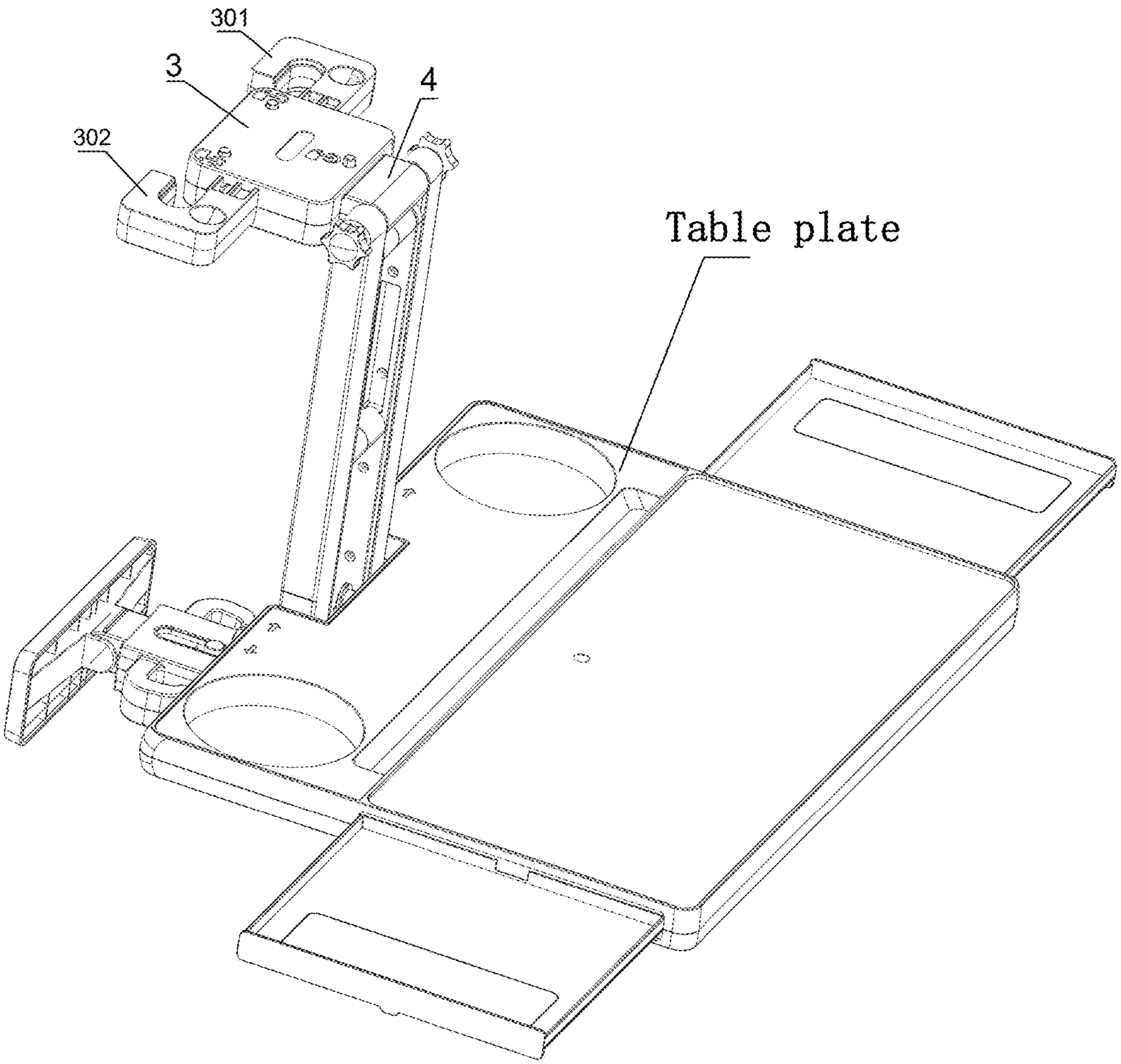
FIG. 23 is a schematic view of a state of a fixing mechanism connected to a table plate in the present disclosure.

As shown in FIG. 1, FIG. 2, and FIGS. 18-23, a vehicle-mounted headrest with side wing is provided, where a connecting bracket 11 is disposed inside the headrest 1, the connecting bracket 11 extends out of the headrest 1 toward two opposite sides and forms connecting portions 12, a fixed cavity 110 is disposed behind the middle portion of the connecting bracket 11, the connection portions 12 are located on opposite left and right sides of the headrest 1, a flexible filler, such as sponge, is further disposed inside the headrest 1, and the flexible filler is located in front of the connecting portions 12 to obtain a flexible support effect to the human head; at least two oppositely disposed side wing assemblies 2, where the side wing assemblies 2 are detachably and rotatably connected to the connection portions 12 of the headrest 1, and the side wing assemblies 2 are configured to support both sides of the human head; and a fixing mechanism 3, configured to fix the headrest 1 and the side wing assemblies 2 to a vehicle seat, where the fixing mechanism 3 includes a housing 30, a left clamping arm 301 and a right clamping arm 302 that are slidably disposed on two opposite sides of the housing 30, and a hook rotatably connected to a rear end of the housing 30, the hook 33 may be rotatably folded and stored, and provide a hook function to rear-seat occupants after being unfolded, which brings convenience; a fixed cavity 110 is formed on the connecting bracket 11, a fixed seat 111 is detachably connected in the fixed cavity 110, a horizontal bar 4 is fixedly connected to or slidably connected front and back to the fixing mechanism 3, and a front end of the horizontal bar 4 is rotatably connected to the fixed seat 111 in the fixed cavity 110; an adjustment screw is disposed between the horizontal bar 4 and the fixed seat 111 and configured to adjust damping forces of the horizontal bar and the fixed seat during rotation; sliding groove bodies 303 with a certain depth are formed in left and right sides of the housing 30 of the fixing mechanism 3, the left clamping arm 301 and the right clamping arm 302 are both inserted into the corresponding sliding groove bodies 303 and are detachably connected, and the left clamping arm 301 and the right clamping arm 302 are the same in structure; the left clamping arm 301 and the right clamping arm 302 are both J-shaped structural bodies, the left clamping arm 301 and the right clamping arm 302 are disposed in a horizontal direction, and fifth teeth 3011 with a certain length are disposed in a length direction on the left clamping arm 301 and the right clamping arm 302; the fixing mechanism 3 further includes a third button body 32 and a sixth elastomer 34 disposed below the third button body 32, a top of the third button body 32 penetrates through the corresponding housing 30 and extends out of the housing 30, sixth teeth 321 are disposed at positions corresponding to the fifth teeth 3011 on an upper surface of the third button body 32, the fifth teeth 3011 are engaged with the sixth teeth 321, and when the corresponding third button body 32 is pressed, the sixth elastomer 34 has compressive deformation, the sixth teeth 321 on the third button body 32 are separated from the fifth teeth 3011, and the left clamping arm 301 and the right clamping arm 302 are in an unlocked state; in the case, a clamping distance between the two clamping arms may be adjusted, and the left clamping arm 301 or the right clamping arm 302 may further be detached; when the user loosens the third button body 32, the sixth elastomer is reset to elastically support the third button body 32, and in this case, the left clamping arm 301 or the right clamping arm 302 cannot be moved left and right; during mounting, the left clamping arm 301 or the right clamping arm 302 is first moved to an appropriate position, such that there is an enough mounting space between the left clamping arm and the right clamping arm, then the hook structures at the front ends of the left clamping arm 301 and the right clamping arm 302 are aligned with two metal connecting rods of the headrest of the vehicle seat, the left clamping arm 301 and the right clamping arm 302 are folded until the hook structures of the two clamping arms are tightly snapped into the two metal connecting rods of the headrest of the vehicle seat to complete mounting of the headrest 1; in some embodiments, as shown in FIG. 23, the fixing mechanism 3 may be further connected to a table plate through the horizontal bar 4, such that the usage scenario is expanded. The rear-seat occupants may place a notebook computer on the table plate for work conveniently.

Thus, by disposing the two side wing assemblies 2 on the headrest 1 to support the head of the user in the left-right direction and from the rear, the comfort level is high and the user experience is effectively enhanced.

As shown in FIGS. 1-8, the side wing assemblies 2 each include a side wing 22, a first connecting mechanism 21, and a second connecting mechanism 23 disposed on the side wing 22, and the side wing 22 is rotatably connected to the second connecting mechanism 23 and slidably connected to the first connecting mechanism 21 through the second connecting mechanism 23; the first connecting mechanism 21 includes a support rod 211, the support rod 211 is integrally an L-shaped structural body, a track hole 212 is formed in the support rod 211 in a length direction of the support rod 211, the track hole 212 penetrates through the support rod 211, the track hole 212 is a rectangular hole or an elliptical hole, a limiting platform 213 is disposed in the track hole 212, and first teeth 214 are disposed on two opposite sides of the limiting platform 213; the first connecting mechanism 21 further includes an insertion portion 215 rotatably connected to the support rod 211, the insertion portion 215 is configured to mate with the connecting portions 12, a first elastomer 216 and a first button body 217 that is disposed above the first elastomer 216 are disposed in the insertion portion 215, a button mounting cavity 210 is disposed on the insertion portion 215, the first button body 217 and the first elastomer 216 are both disposed in the button mounting cavity 210, the first elastomer 216 is configured to reset the first button body 217 by pressing, the first elastomer 216 is configured as a spring, the first button body 217 penetrates through a shell of the corresponding insertion portion 215 and is in a protruding state, the first button body 217 is connected to the insertion portion 215 in a pressable manner, and a positioning boss 218 is transversely disposed on a surface of the insertion portion 215, each of the connecting portions 12 is a tubular structural body, an insertion cavity 120 is formed inside each of the connecting portions 12, the insertion cavity 120 is a round cavity or polygonal cavity or special-shaped cavity with a certain depth, a snap-fit hole 121 is formed in a position corresponding to the first button body 217 on each of the connecting portions 12, a positioning groove 122 adapted to the positioning boss 218 is disposed on an inner wall of the snap-fit hole 121, and the side wing assemblies 2 are quickly mounted and detached through cooperation of the first button body 217 and the snap-fit hole 121; when the side wing assemblies 2 are mounted, the front end of the insertion portion 215 is first aligned with the insertion cavity 120, where the positioning boss 218 is flush with the positioning groove 122 to push the support rod 211 until the first button body 217 is snapped into the snap-fit hole 121; the first button body 217 protrudes out of the snap-fit hole 121 to form a mounting locked state of the side wing assemblies 2; when the user needs to detach the side wing assemblies 2 to clean and store, the first button body 217 is only pressed, the first button body 217 presses downward, the first elastomer 216 is subjected to compressive deformation, the first button body 217 is separated from the snap-fit hole 121, and in this case, the side wing assemblies 2 are in an unlocked state, the user pulls the side wing assemblies 2 outward, the insertion portion 215 is separated from the insertion cavity 120 on each of the connecting portions 215 to complete quick detachment.

Thus, by forming the snap-fit hole 121 adapted to the first button body 217, the side wing assemblies may be quickly detached and mounted.

Embodiment 2

As shown in FIGS. 1-8 and FIG. 17, a vehicle-mounted headrest with side wings is provided. The insertion portion 215 further includes a first damping mechanism 10, configured to generate a damping effect when the first connecting mechanism 21 rotates. The first damping mechanism 10 includes a bow-shaped member 101 and a second elastomer 102 disposed inside the insertion portion 215, an insertion cavity 2111 is disposed at a position where the support rod 211 and the insertion portion 215 are connected, a rear end of the insertion portion 215 is inserted into the insertion cavity 2111, the insertion portion 215 is rotatably connected to the support rod 211 through a rotation shaft and forms a rotating state of the support rod 211. A plurality of damping grooves 123 are formed in an inner ring of the insertion cavity 2111, a damping platform 1011 extending into the damping grooves 123 is disposed at a top of the bow-shaped member 101, and the second elastomer 102 is disposed below the bow-shaped member 101. In this embodiment, the bow-shaped member 101 and the second elastomer 102 are located at a tail end of the insertion portion 215. Two bow-shaped members 101 and second elastomers 102 are respectively disposed. Two springs are located between the two bow-shaped members 101, the two bow-shaped members 101 are disposed up and down opposite to each other; the damping platform 1011 penetrates through the shell of the corresponding insertion portion 215, the damping grooves 123 are formed corresponding to the damping platform 1011, where the damping platforms 1011 on the two bow-shaped members 101 face the corresponding damping grooves 123 to elastically support the bow-shaped members 101, and when the damping platforms 1011 of the bow-shaped members 101 are snapped into the damping grooves 123, rotating positions of the side wing assemblies 2 are in a locked state.

Thus, by disposing the first damping mechanism 10, when the support rod 211 rotates, there is a certain damping force to prevent the support rod 211 from rotating arbitrarily.

By disposing the support rod 211 and the rotatably connected insertion portions 215, the side wing 22 may rotate front and back in the circumferential direction for adjustment to obtain an optimal support effect on both sides of the face of the user, thereby improving the fit degree to both sides of the face of the user.

Embodiment 3

As shown in FIGS. 7-13, a vehicle-mounted headrest with side wings is provided. The second connecting mechanism 23 includes a pedestal 2301, a rotating disc 232, and a second damping mechanism 20, the pedestal 2301 is embedded into the side wing 22, a rotating cavity 233 is disposed inside the pedestal 2301, the pedestal 2301 includes an upper shell 23011 and a bottom shell 23012, the rotating cavity 233 is located on the bottom shell 23012, the rotating disc 232 is located in the rotatably connected rotating cavity 233, and the second damping mechanism 20 is configured to generate a damping effect when the rotating disc 232 rotates; a top of the rotating disc 232 extends upward to pass through the track hole 212 in the support rod 211, a cover plate 234, a second button body 235, and a third elastomer 236 are disposed at the top of the rotating disc 232, the third elastomer 236 is a spring and is located below the second button body 235 and configured to reset the second button body 235 by pressing, a top of the second button body 235 penetrates through the cover plate 234, the cover plate 234 is located outside the track hole 212 and contacts with the limiting platform 213, the cover plate 234 is fixedly connected to the rotating disc 232, the rotating disc 232 is located inside the track hole 212, and the rotating disc and the track hole form a clamping state of the limiting platform 213; when the side wing 22 moves up and down or left and right, the tops of the cover plate 234 and the rotating disc 232 slide up and down or left and right, fourth teeth 237 are disposed at positions corresponding to the first teeth 214 on the second button body 235, the first teeth 237 are disposed on an upper surface of the second button body 235, the fifth teeth 214 are engaged with the fourth teeth 237, when the second button body 235 is pressed, the fourth teeth 237 on the second button body 235 are away from the first teeth 214, and in this case, the second connecting mechanism 23 is in a sliding unlocking state, and the second button body 235 is loosened, and under a reset force of the third elastomer 236, the second button body 235 is reset, and the first teeth 214 are engaged with the fourth teeth 237 to form a locked state of the second connecting mechanism 23.

Thus, by disposing the second connecting mechanism 23 and the track hole 212, the side wing 22 connected to the second connecting mechanism 23 may move front and back to adjust the support height of the side wing 22, so as to fit different heights and meet different requirements of users.

Embodiment 4

Figure 1:
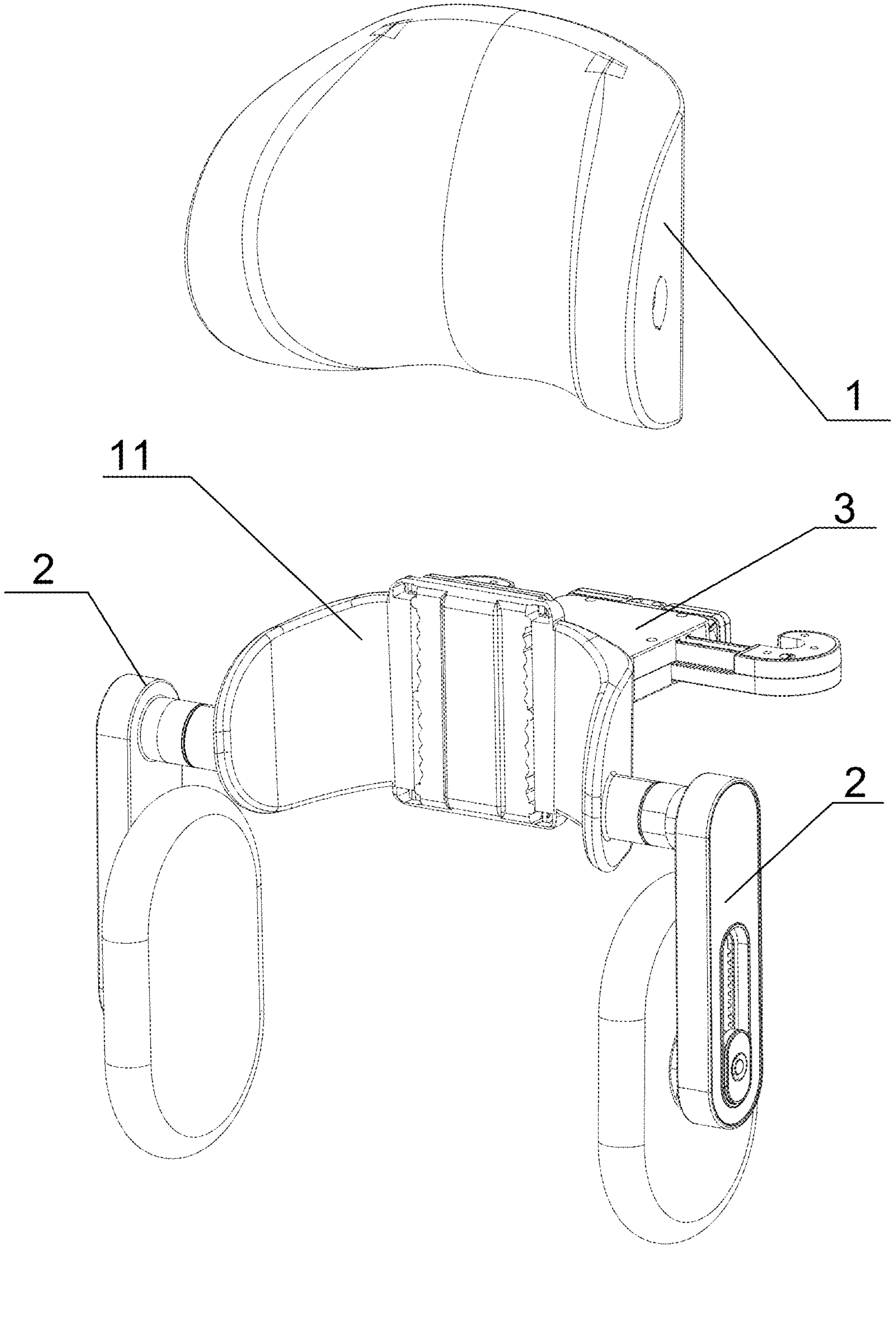
FIG. 1 is an overall schematic structural view of the present disclosure.
Figure 2:
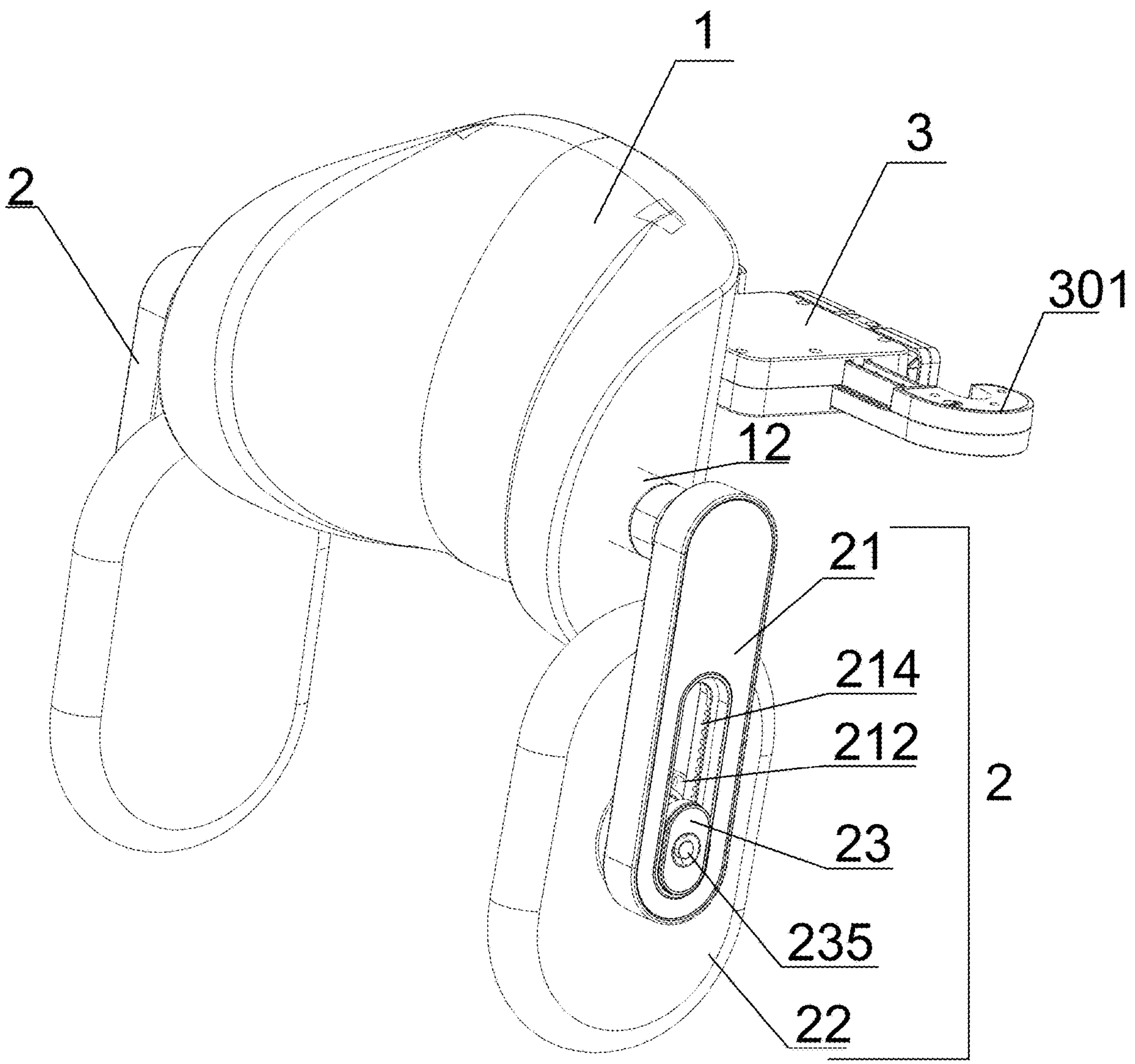
FIG. 2 is an overall schematic perspective view of the present disclosure.
Figure 3:
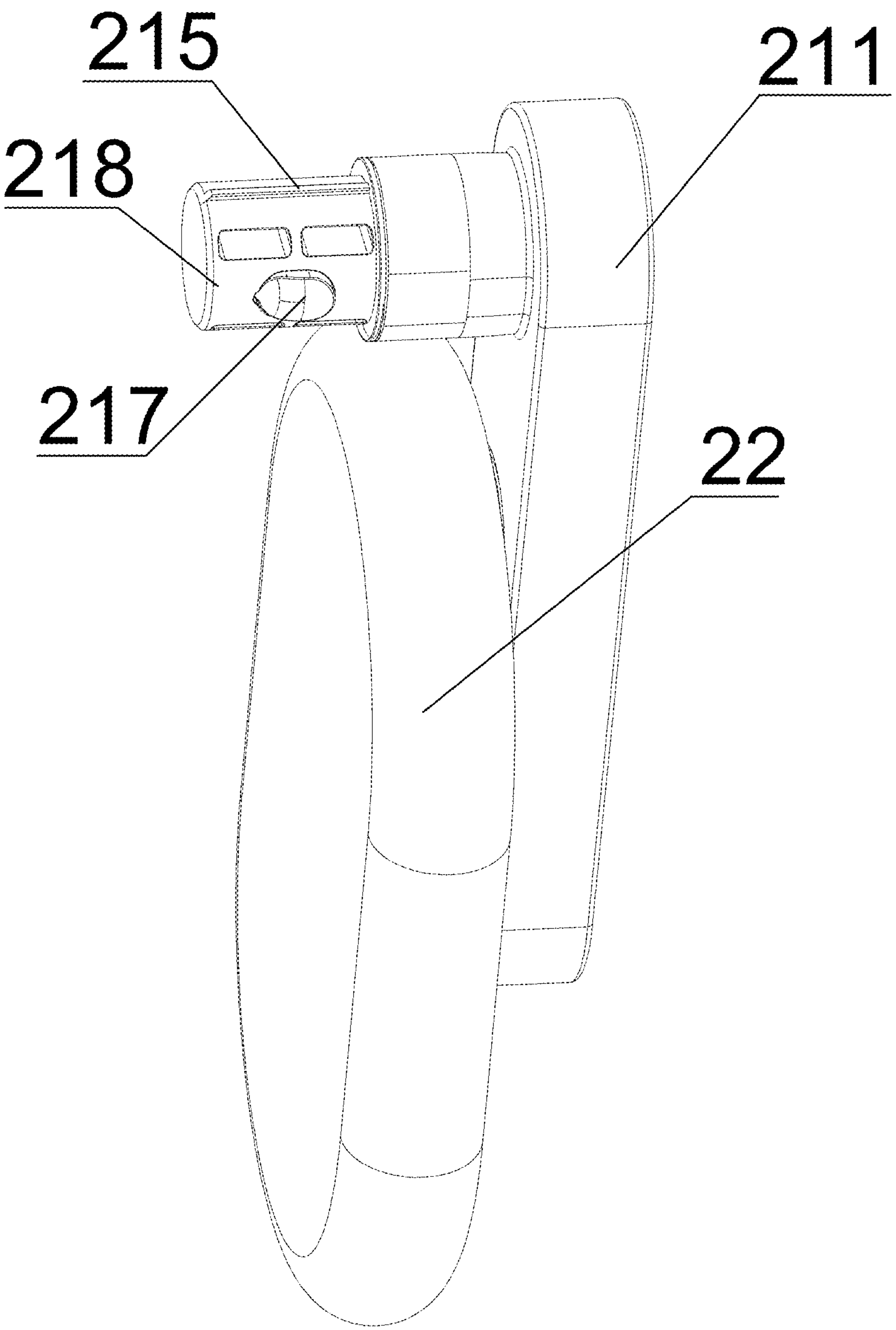
FIG. 3 is a schematic perspective view I of a side wing assembly in the present disclosure.
Figure 4:
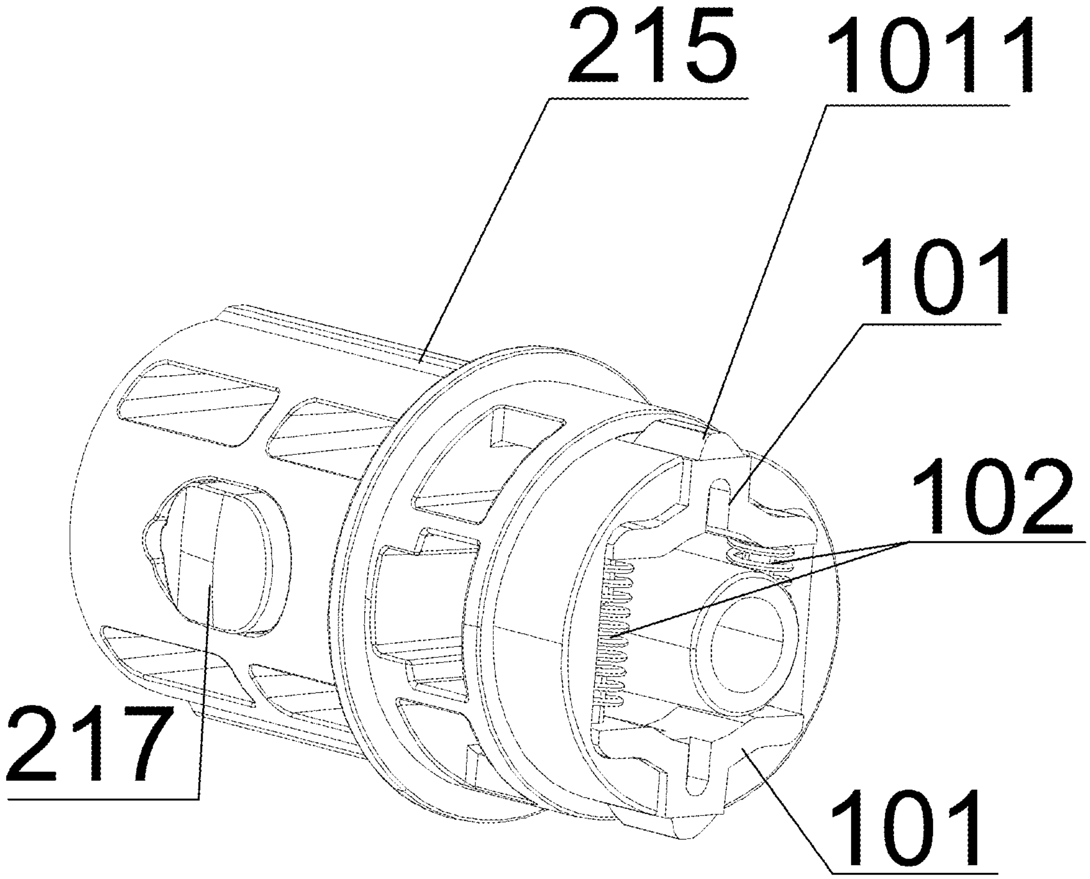
FIG. 4 is a schematic structural view of an insertion portion in the present disclosure.
Figure 5:
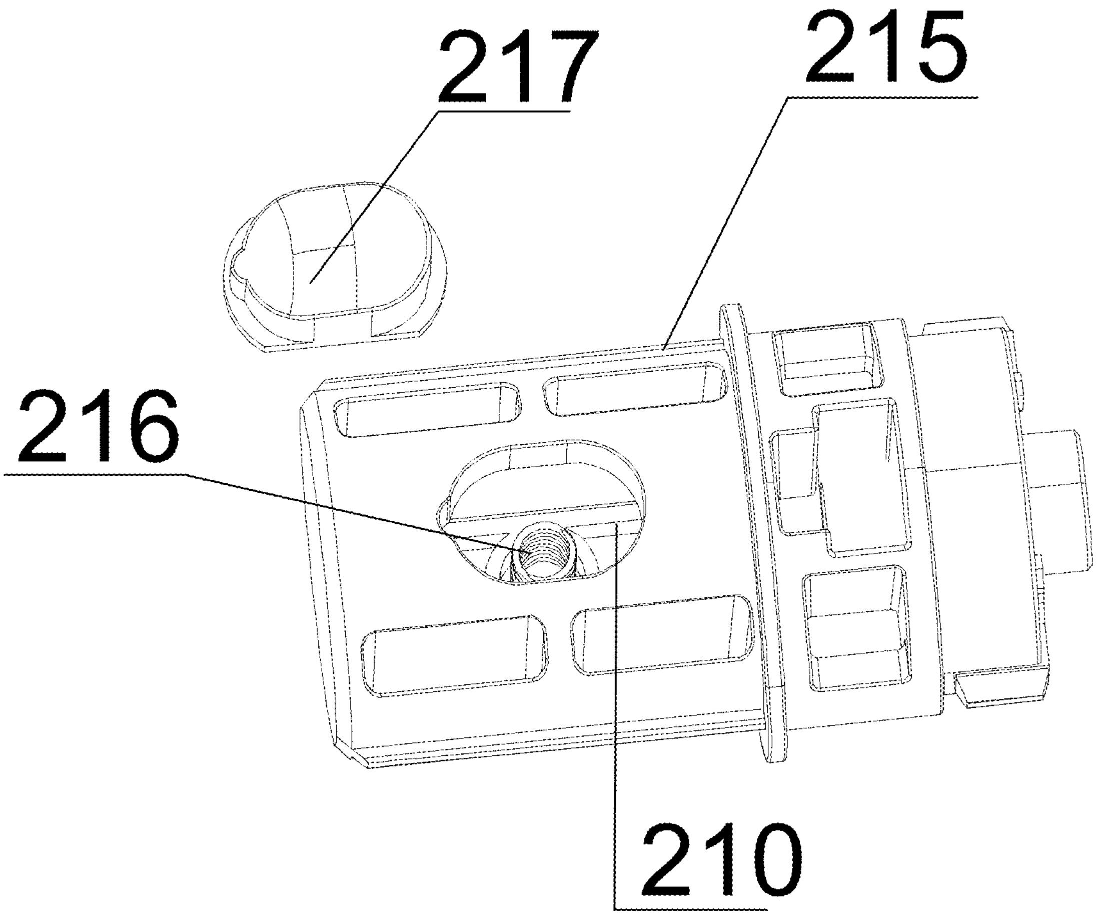
FIG. 5 is a schematic structural view of an interior of an insertion portion in the present disclosure.
Figure 6:
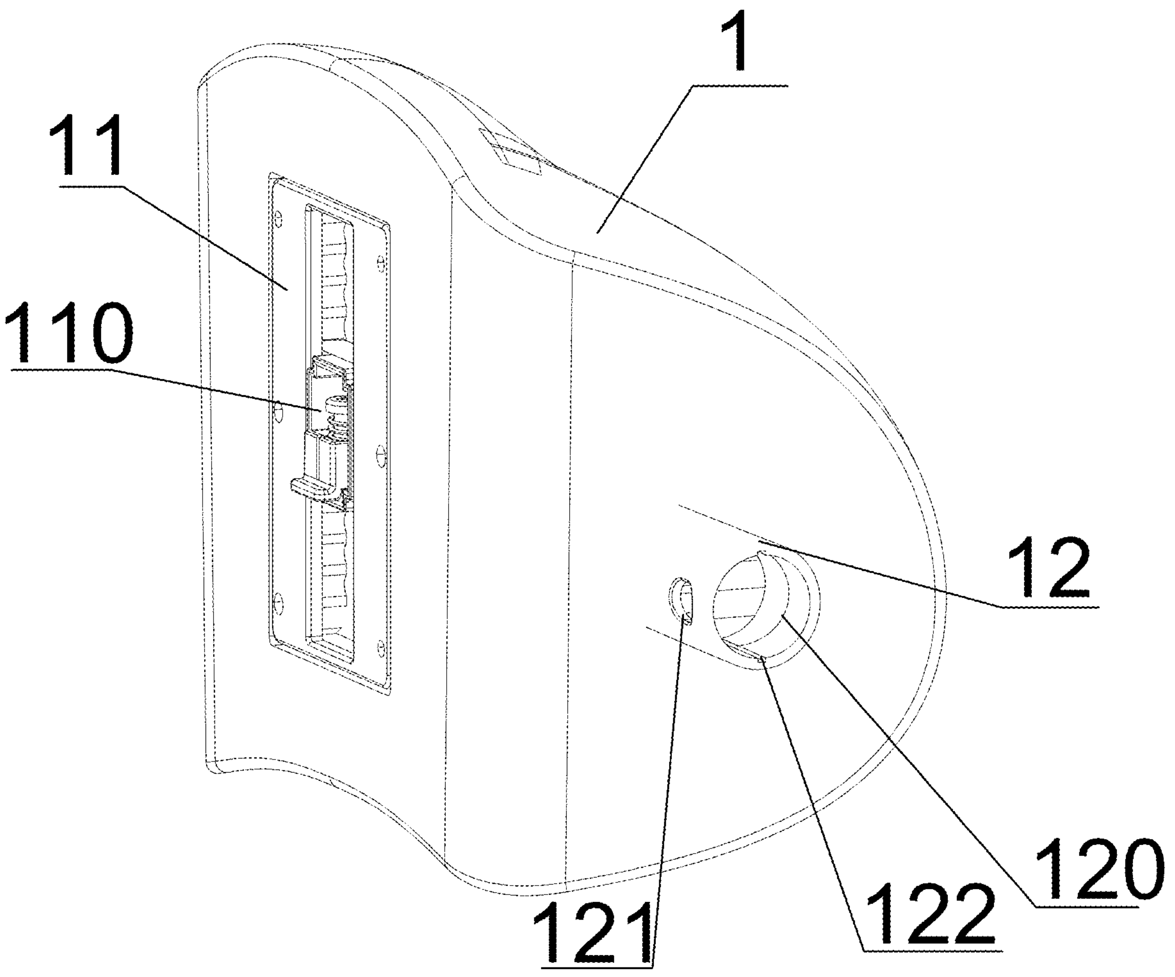
FIG. 6 is a schematic structural view of a headrest and a connecting portion in the present disclosure.
Figure 7:
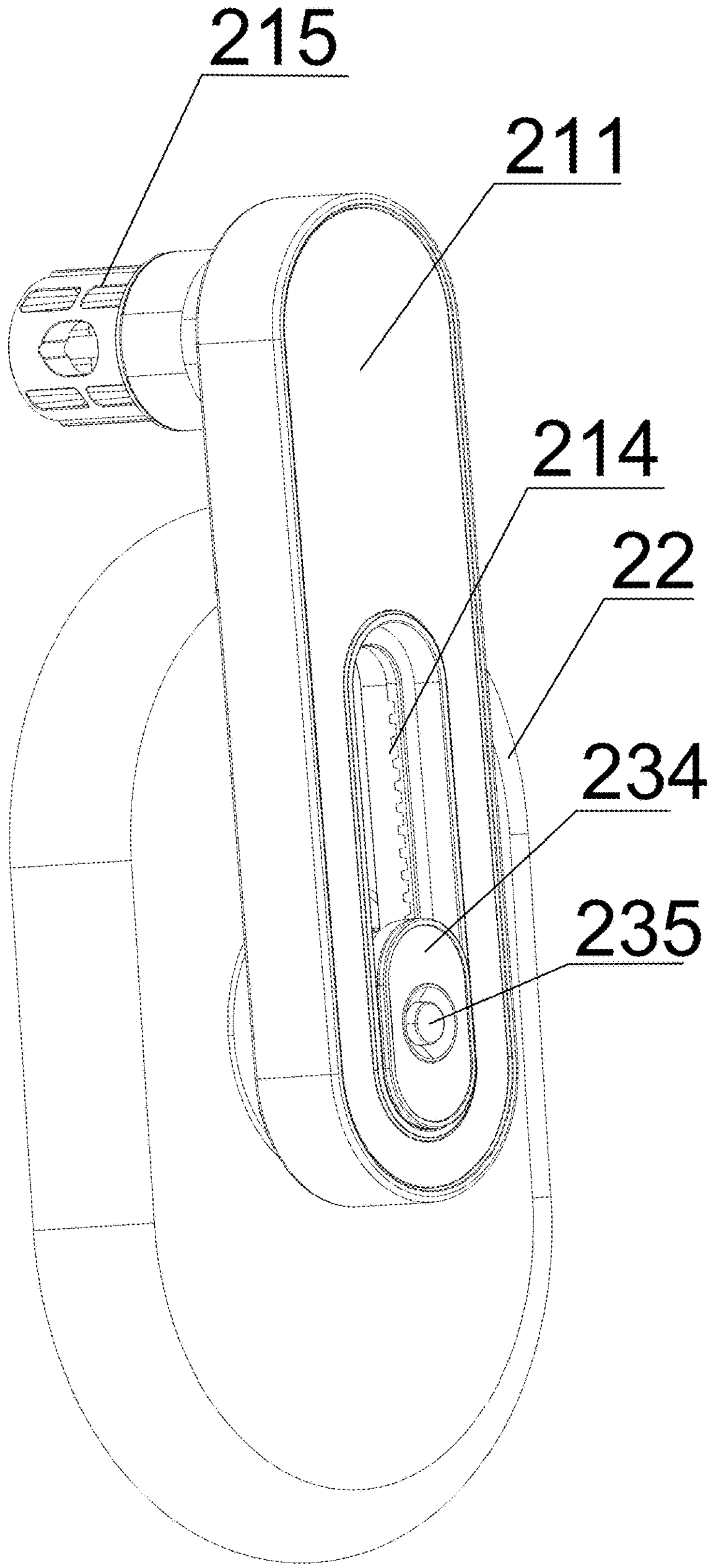
FIG. 7 is a schematic perspective view II of a side wing assembly in the present disclosure.
Figure 8:
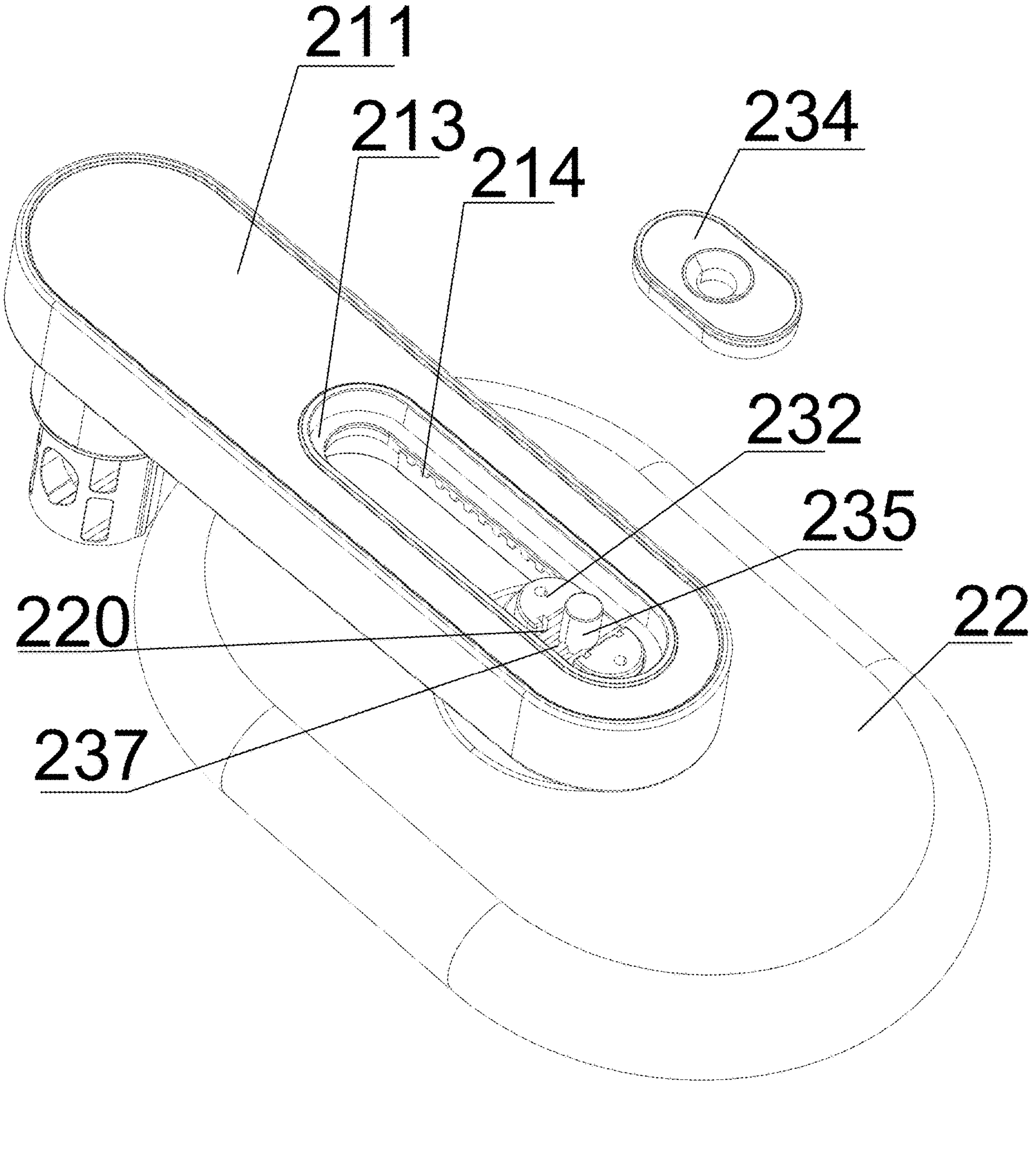
FIG. 8 is a schematic structural view of a second connecting mechanism and a first connecting mechanism in the present disclosure.
Figure 9:
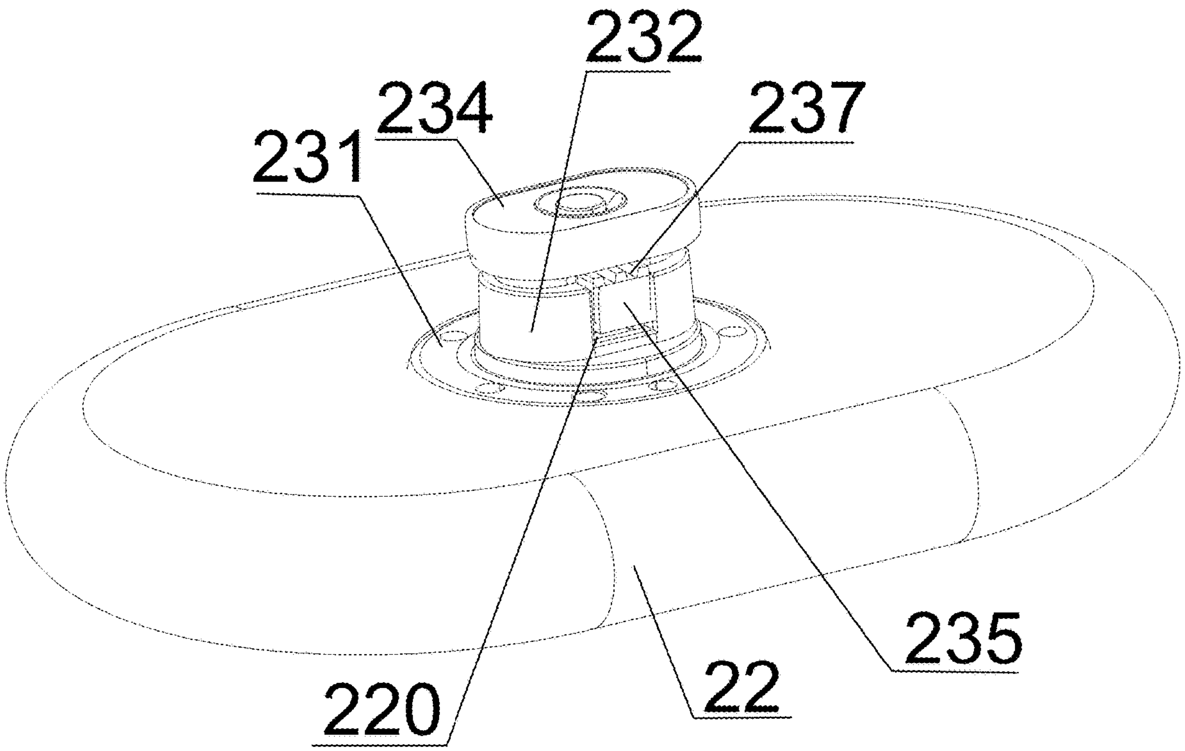
FIG. 9 is a schematic structural view of a side wing and a second connecting mechanism in the present disclosure.
Figure 10:
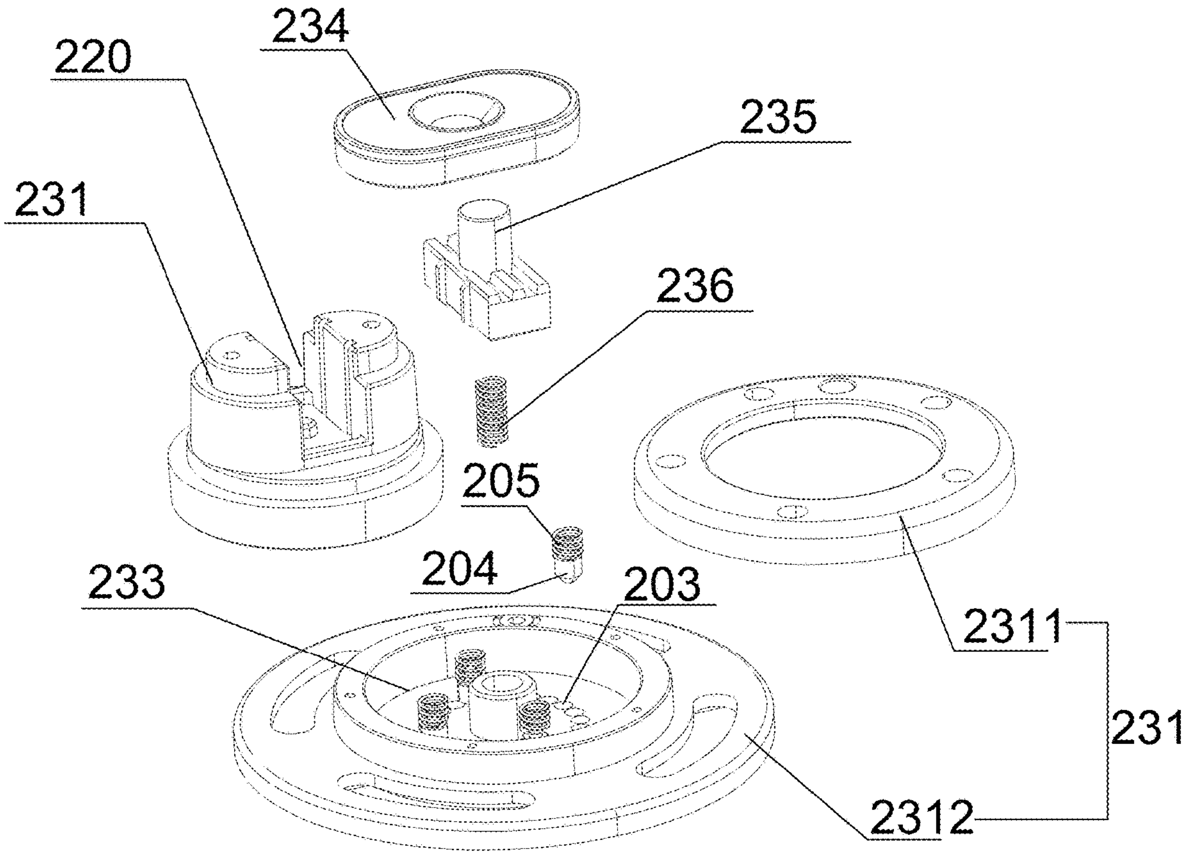
FIG. 10 is an exploded view I of a second connecting mechanism in the present disclosure.
Figure 11:
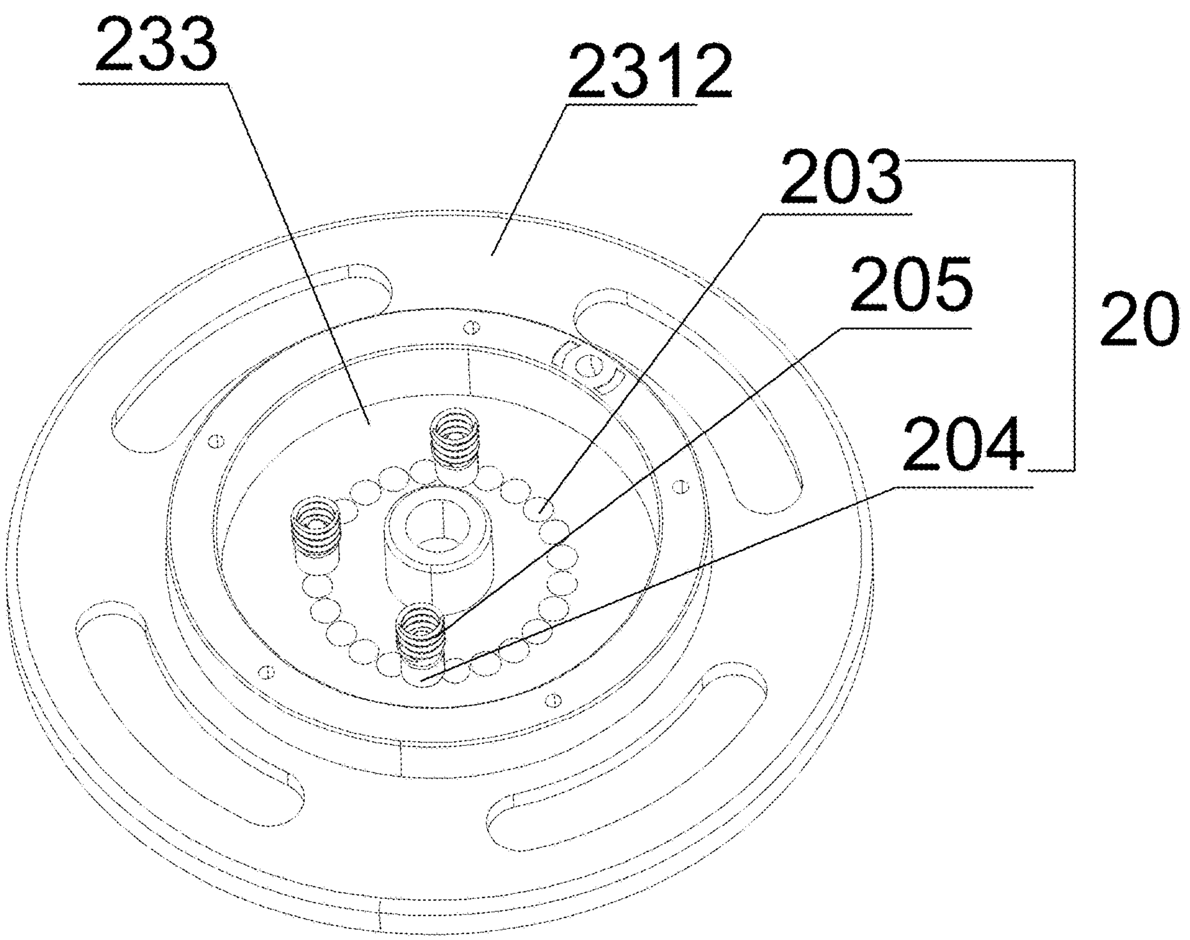
FIG. 11 is a schematic structural view of an interior of a pedestal in the present disclosure.
Figure 12:
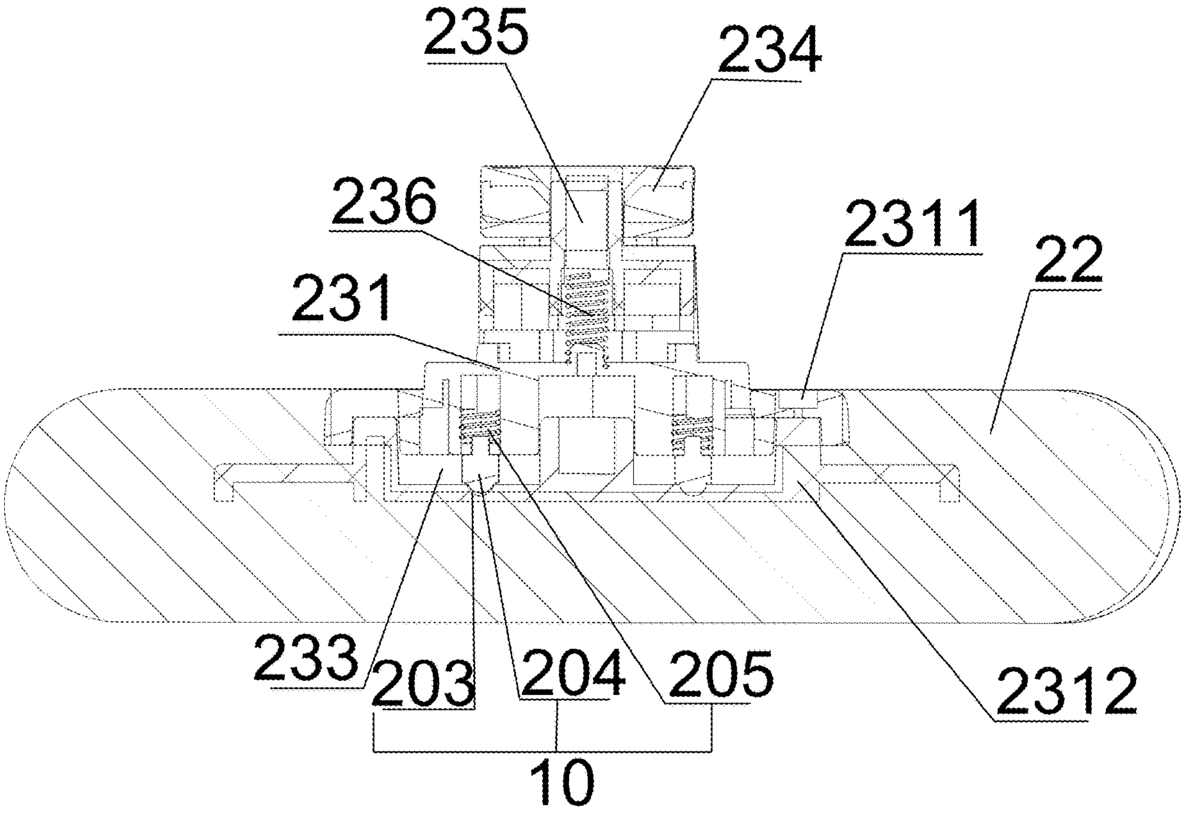
FIG. 12 is a sectional view I of a side wing and a second connecting mechanism in the present disclosure.
Figure 13:
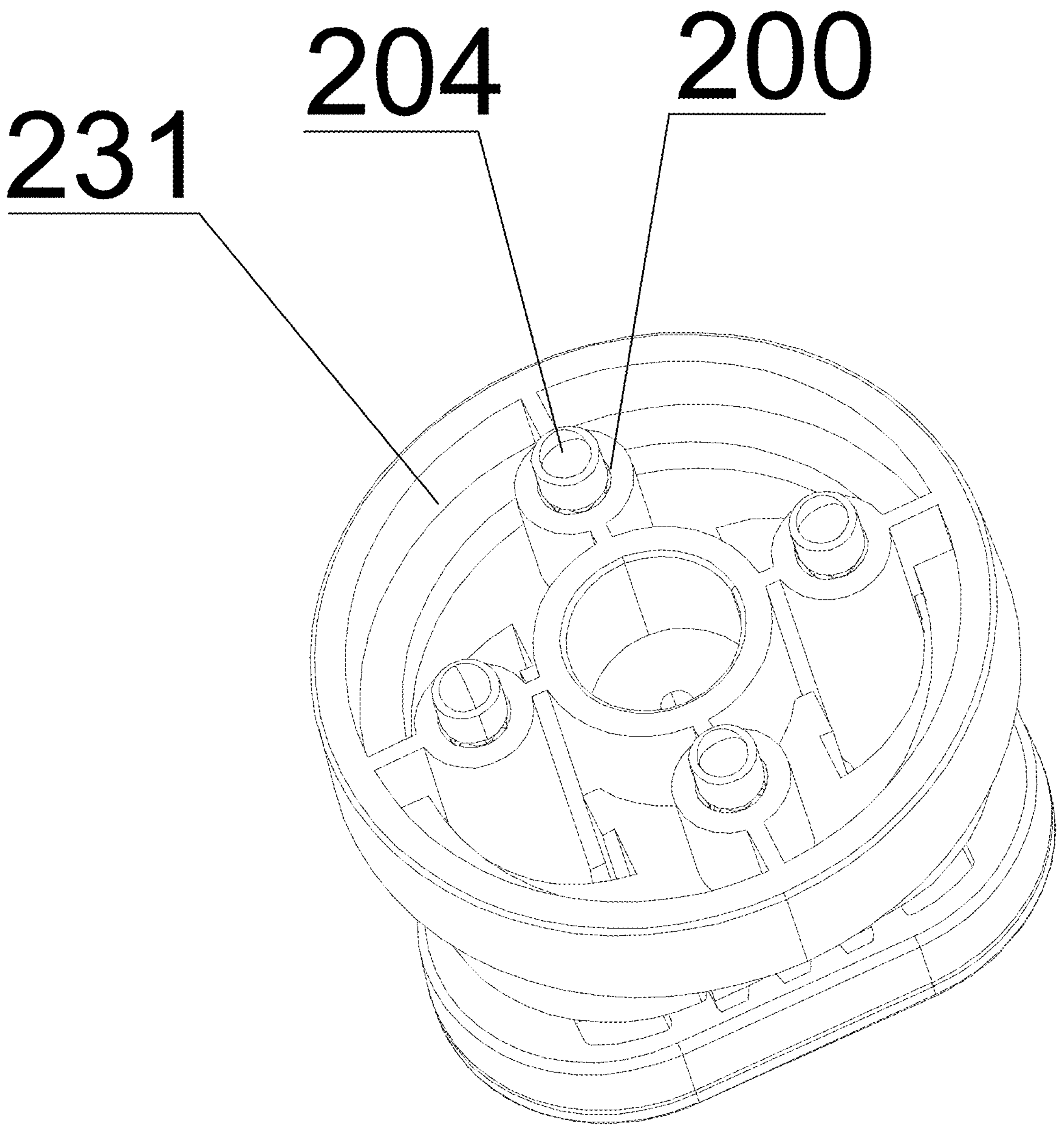
FIG. 13 is a schematic structural view of an interior of a bottom of a rotating disc in the present disclosure.
Figure 14:
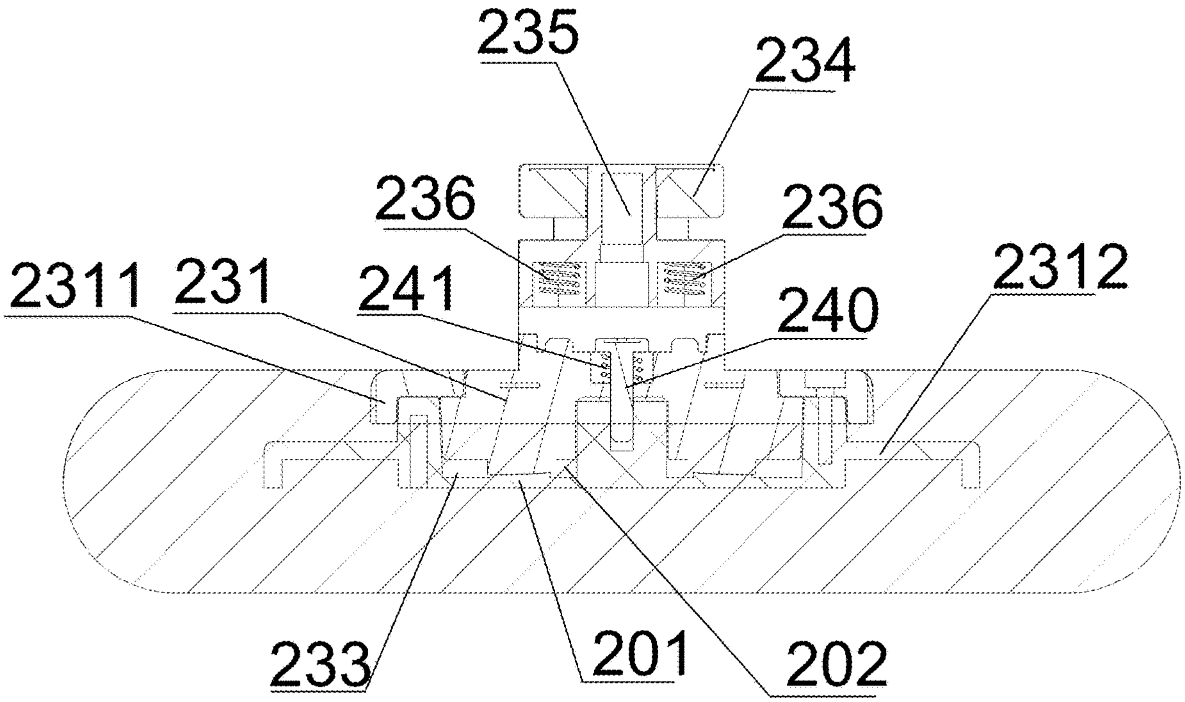
FIG. 14 is a sectional view II of a side wing and a second connecting mechanism in the present disclosure.
Figure 15:
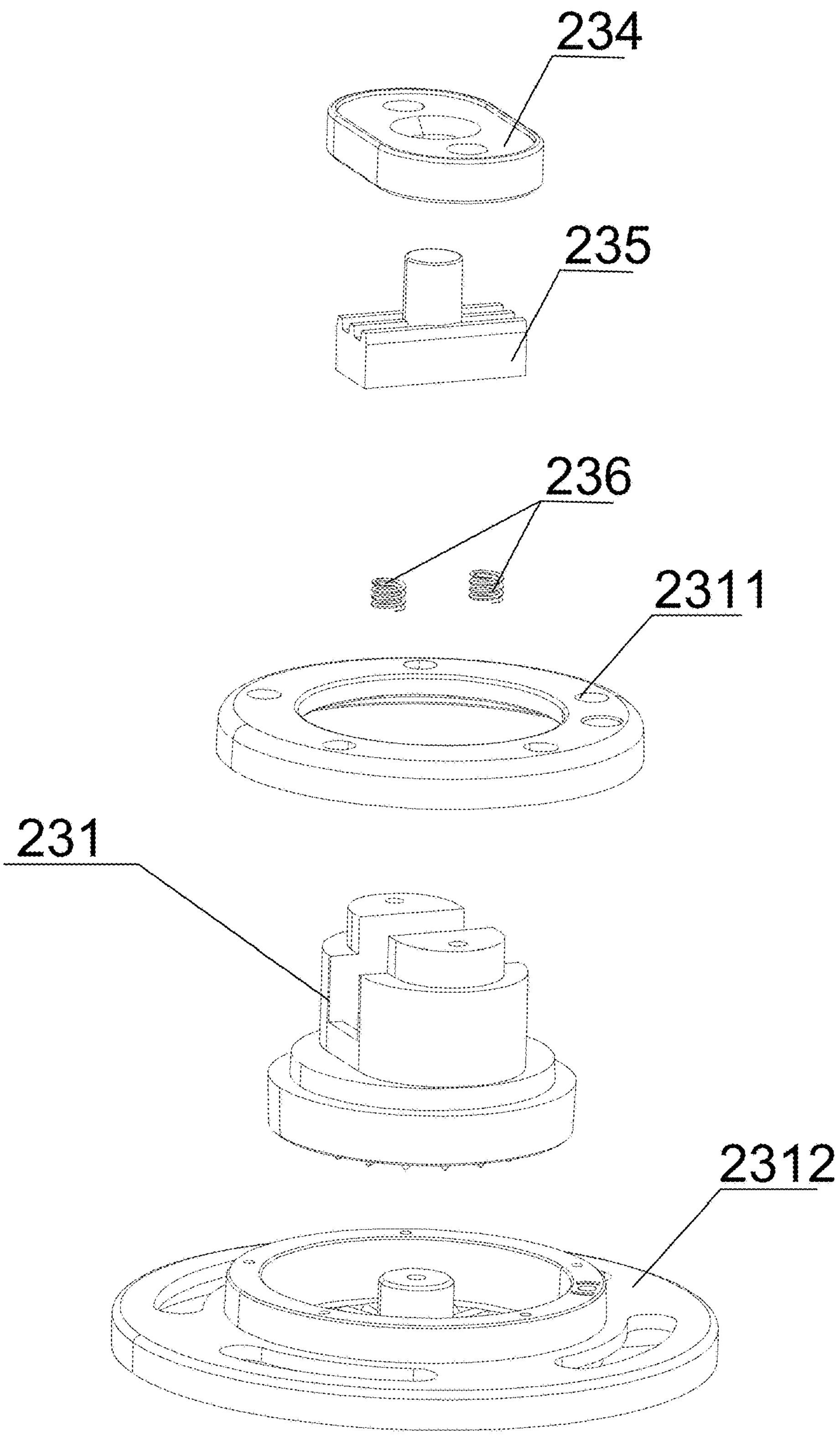
FIG. 15 is an exploded view of a structure of a second connecting mechanism in the present disclosure.
Figure 16:
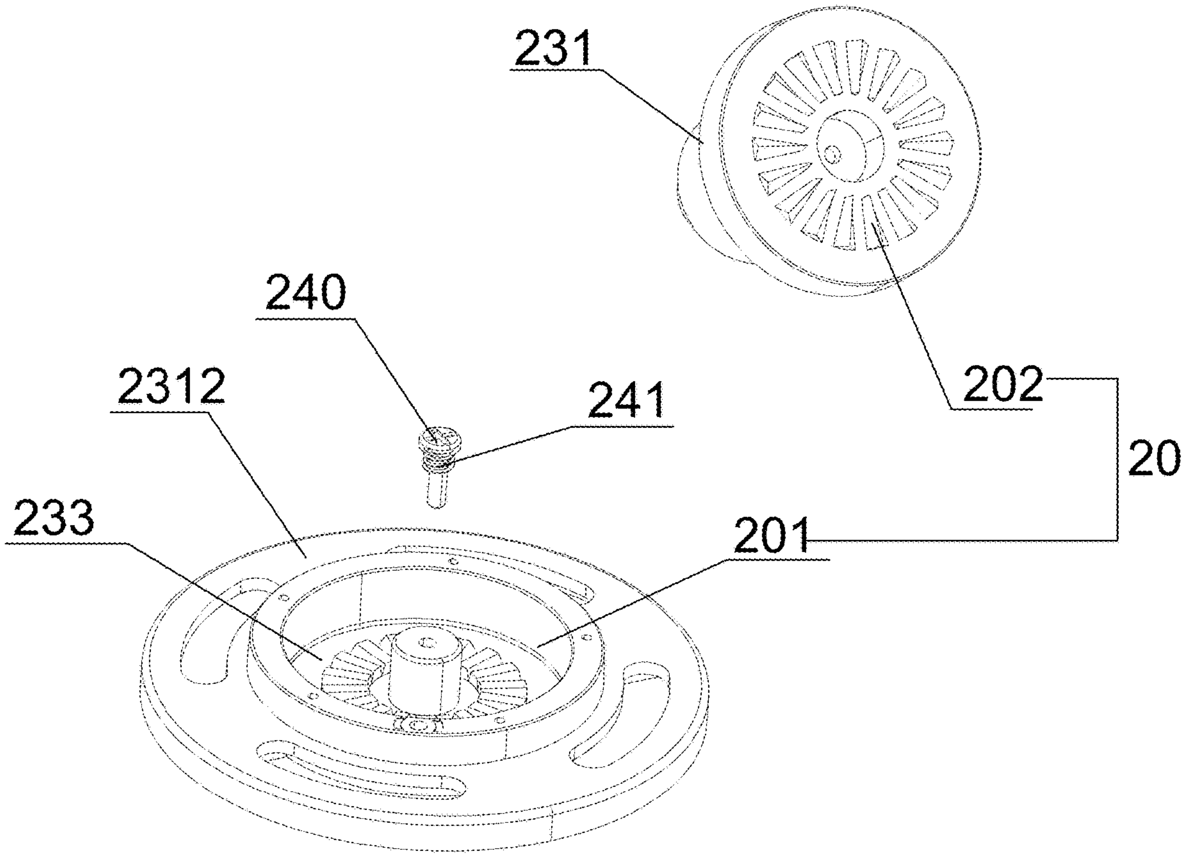
FIG. 16 is a schematic structural view of third teeth and second teeth in the present disclosure.
Figure 17:
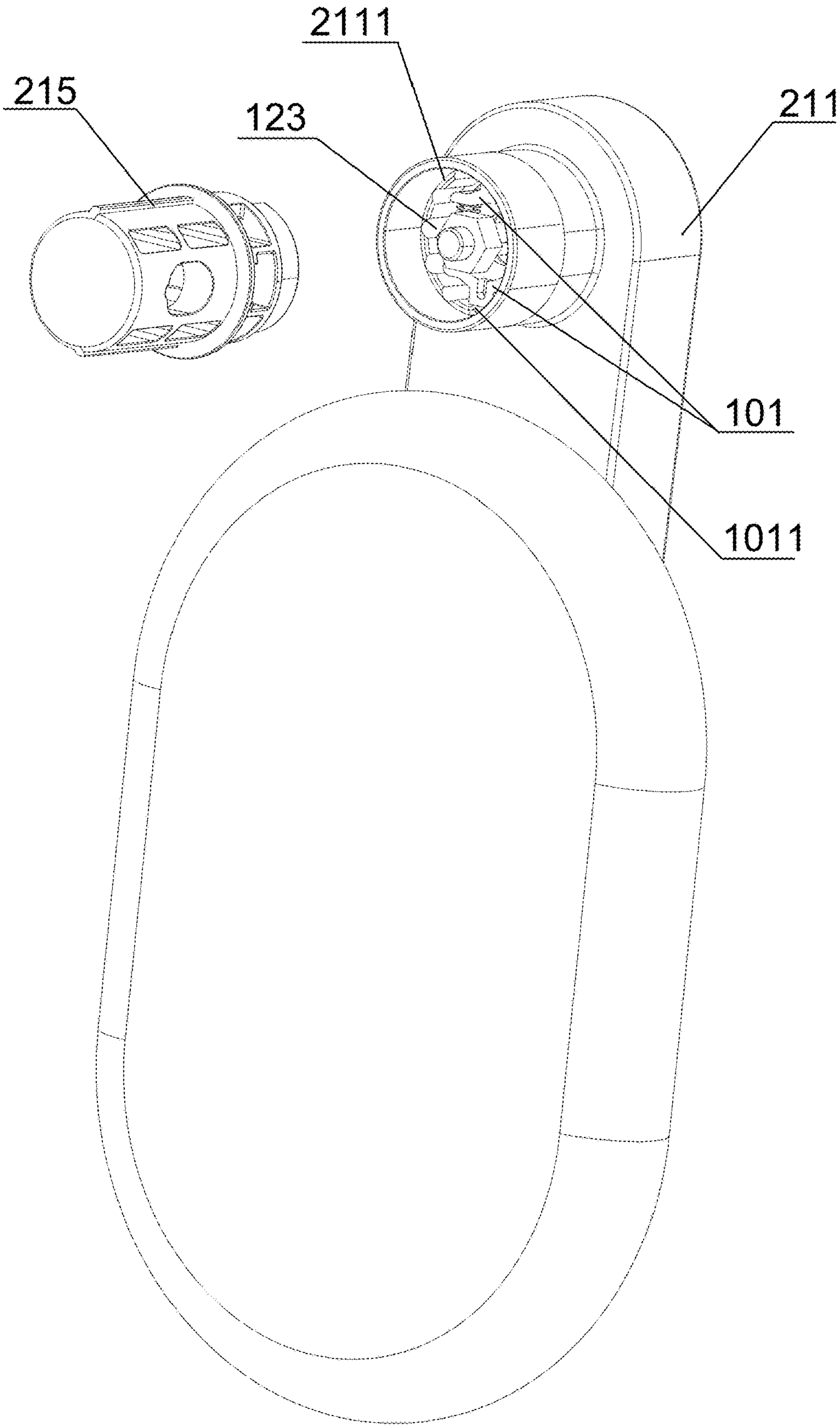
FIG. 17 is a schematic structural view of an insertion cavity in the present disclosure.
Figure 18:
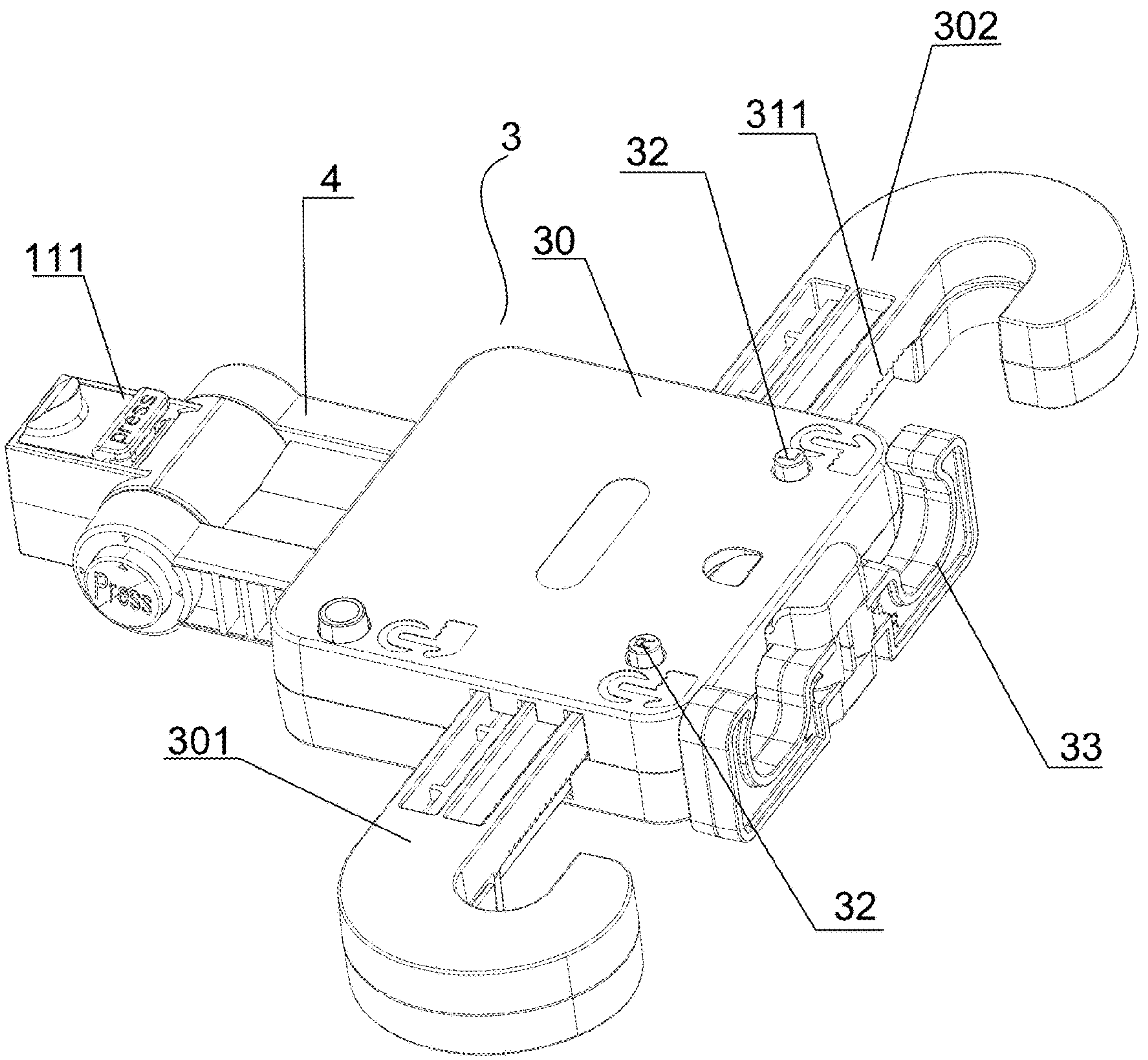
FIG. 18 is a schematic perspective view of a fixing mechanism in the present disclosure.
Figure 19:
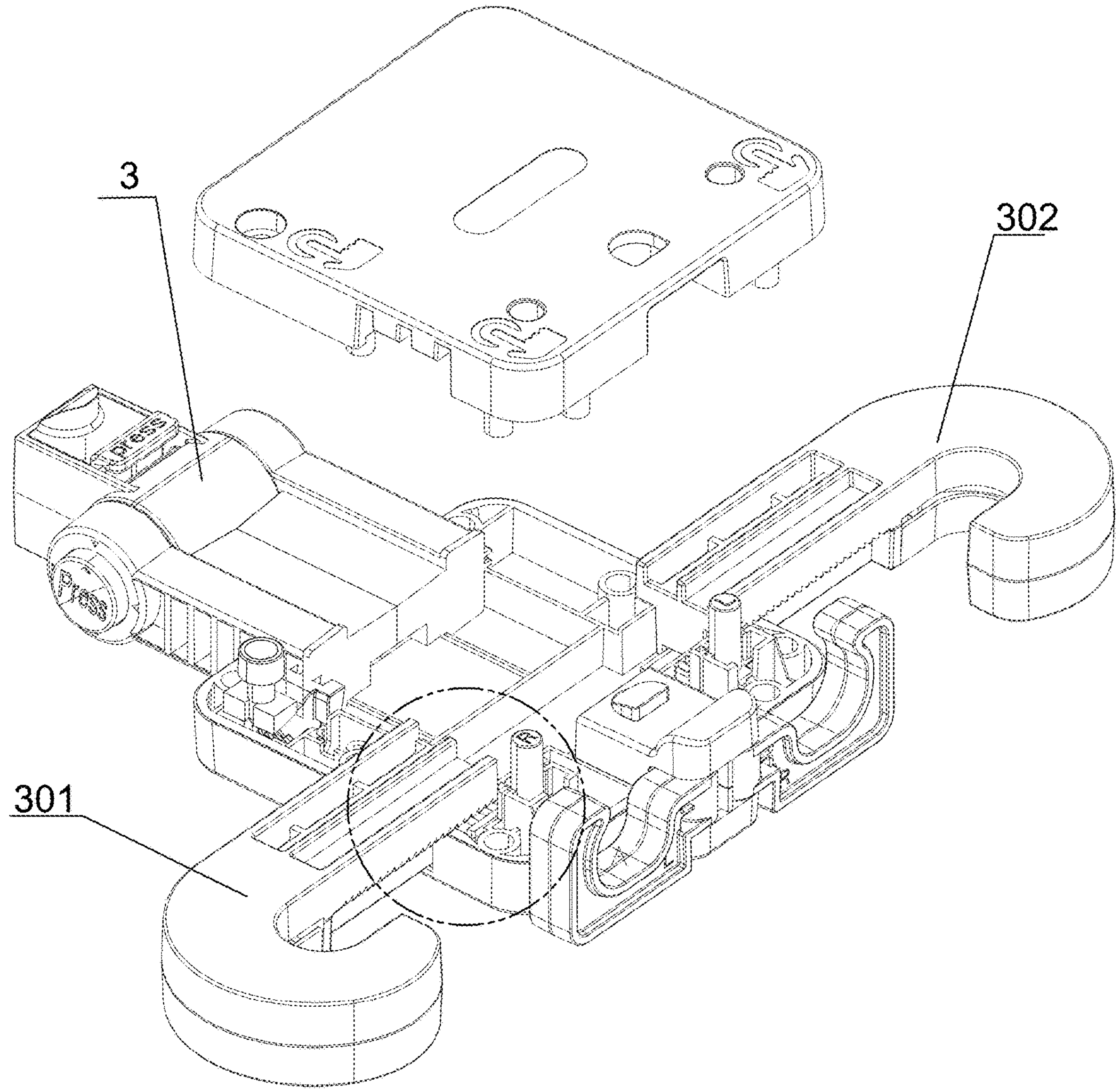
FIG. 19 is a schematic structural view I of an interior of a fixing mechanism in the present disclosure.
Figure 20:
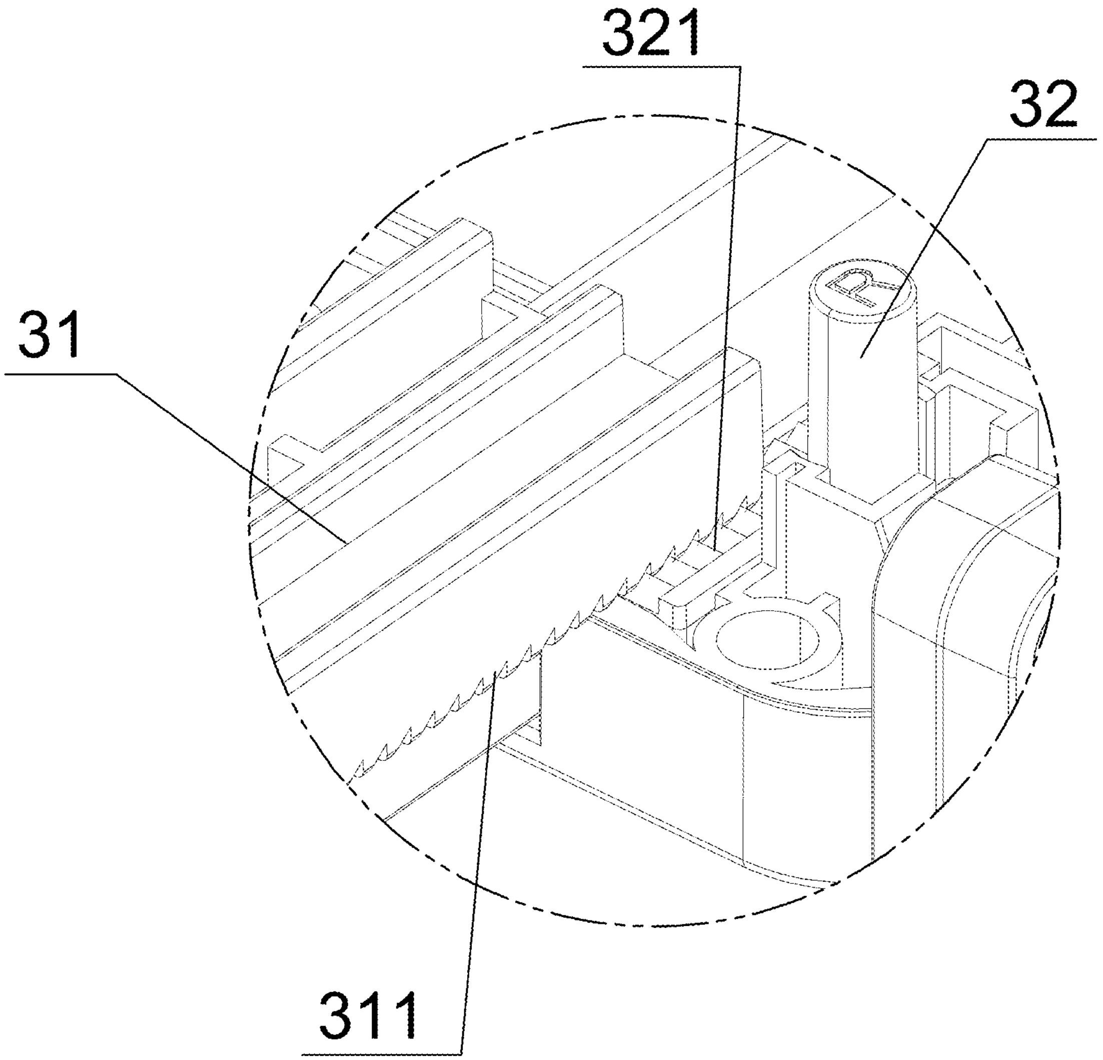
FIG. 20 is a partially enlarged view of FIG. 19 in the present disclosure.
Figure 21:
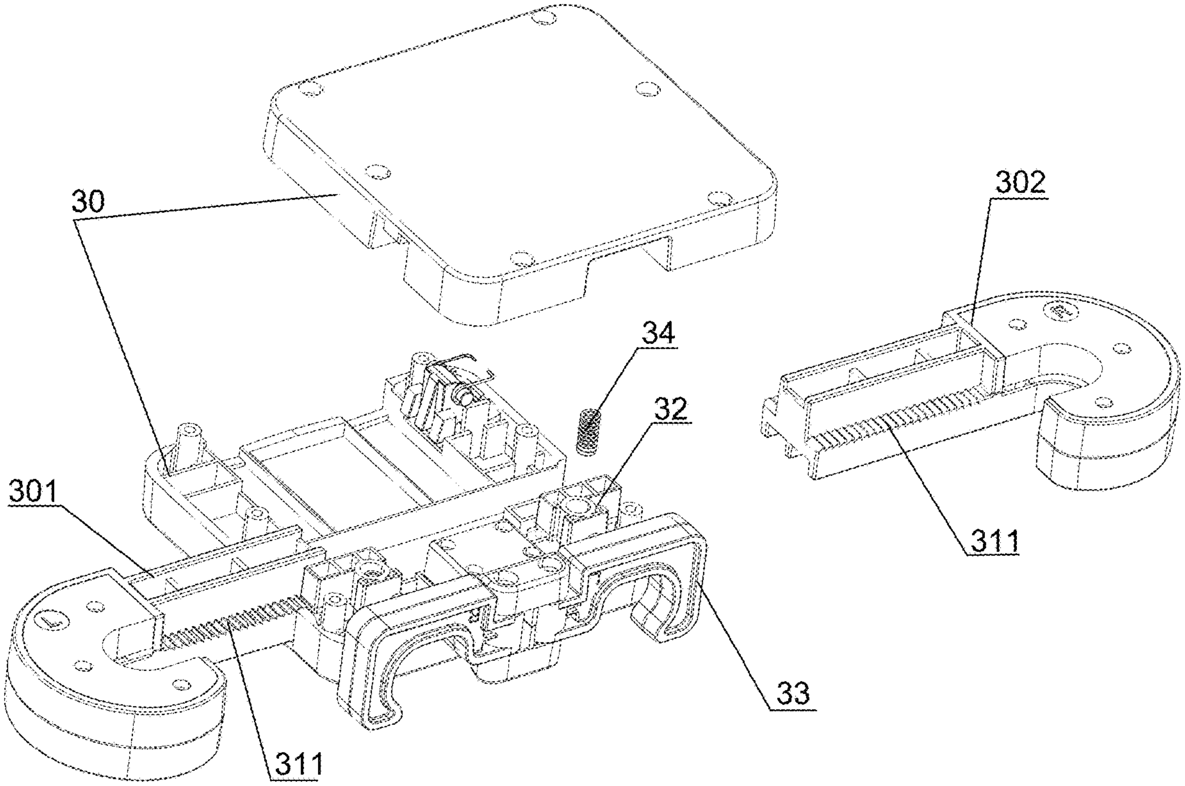
FIG. 21 is a schematic view II of an interior of a fixing mechanism in the present disclosure.
Figure 22:
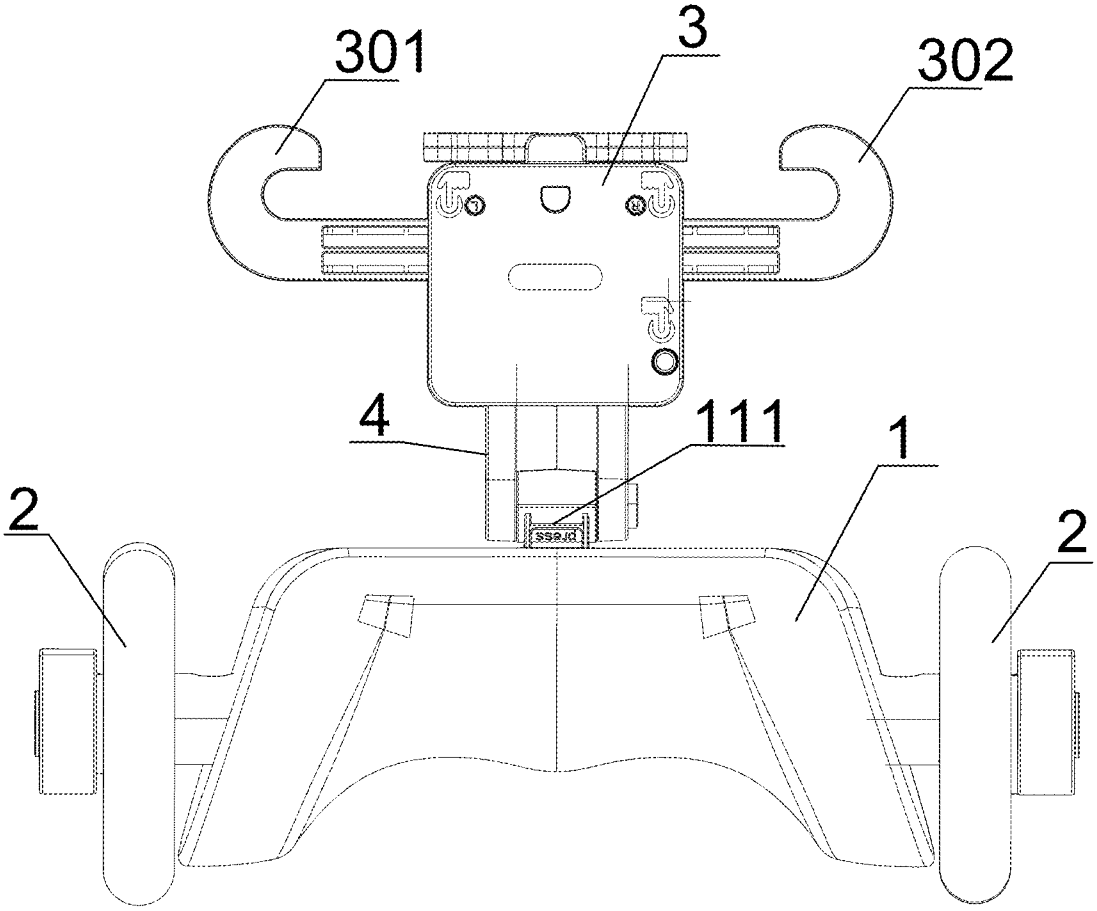
FIG. 22 is an overall top view of the present disclosure.

As shown in FIGS. 14-15, a vehicle-mounted headrest with side wings is provided. The second damping mechanism 20 includes second teeth 201 annularly disposed at a bottom of the rotating cavity 233 and third teeth 202 disposed on the rotating disc 232, and the third teeth 202 and the second teeth 201 are disposed opposite to each other and are engaged with each other. A groove is formed in the center of the rotating disc 232, a rotating shaft rod 240 is disposed in the groove, a fifth elastomer 241 is sleeved on the rotating shaft rod 240, the fifth elastomer 241 is a spring, the rotating shaft rod 240 penetrates through the groove and extends into the rotating disc 233, a front end of the rotating shaft rod 240 is of an external thread structure, a threaded opening is formed in the rotating cavity 233, an internal thread is disposed in the threaded opening, the rotating shaft rod 240 is connected to the pedestal 2301 through the external thread structure, when the third teeth 202 on the rotating disc 232 are engaged with the second teeth 201, the fifth elastomer 241 elastically abuts against the rotating disc, and when the third teeth 202 on the rotating disc 232 are separated from the engaged second teeth 201, the fifth elastomer 241 has compressive deformation, such that there is a certain damping force when the rotating disc 232 rotates, and the state of the rotating position of the side wing 22 can also be locked.

Embodiment 5

As shown in FIGS. 10-13, a vehicle-mounted headrest with side wings is provided. The second damping mechanism 20 includes a plurality of limiting grooves 203 and limiting posts 204 annularly disposed at the bottom of the rotating cavity 233, and a fourth elastomer 205. In this embodiment, the plurality of limiting grooves 203 are formed. Four limiting posts 204 and fourth elastomers 205 are respectively disposed. The front ends of the limiting posts 204 are of spherical-head structural bodies. The limiting posts 204 are embedded into the rotating disc 232. The fourth elastomers 205 are located below the limiting posts 204 to elastically support the limiting posts 204. Four mounting grooves 200 are formed in the bottom of the rotating disc 232. The four limiting posts 204 and the fourth elastomers 205 are all disposed in the four mounting grooves 200 in a one-to-one correspondence manner. The front ends of the limiting posts 204 abut against the limiting grooves 203 correspondingly. When the front ends of the limiting posts 204 are snapped into the limiting grooves 203, the rotating position of the rotating disc 232 is in a locked state.

In conclusion, compared with the prior art, by disposing the two side wing assemblies 2 on the headrest 1 to support the head of the user in the left-right direction and from the rear, the comfort level is high, and the user experience is effectively enhanced.

Moreover, by disposing the first damping mechanism 10, when the support rod 211 rotates, there is a certain damping force to prevent the support rod 211 from rotating arbitrarily. By disposing the support rod 211 and the rotatably connected insertion portions 215, the side wing 22 may rotate front and back in the circumferential direction for adjustment, so as to obtain an optimal support effect on both sides of the face of the user, thereby improving the fit degree to both sides of the face of the user; by disposing the second connecting mechanism 23 and the track hole 212, the side wing 22 connected to the second connecting mechanism 23 may move front and back to adjust the support height of the side wing 22 to fit different heights and meet different requirements of users.

Since the side wing assemblies 2 are mounted on the headrest 1, the headrest 1 and the side wing 22 may be mounted and fixed conveniently by only one fixing mechanism 3.

The above descriptions are merely preferred embodiments of the present disclosure and are not intended to limit the present disclosure. For those skilled in the art, various modifications and variations may be made to the present disclosure. Any modification, equivalent replacement, improvement, etc., made within the spirit and principle of the present disclosure should be included in the protection scope of the present disclosure.

What is claimed is:

1. A vehicle headrest with side wings, comprising:

a headrest, wherein a connecting bracket is disposed in the headrest, the connecting bracket extends out of the headrest toward two opposite sides to form connecting portions, and the headrest is configured to support a human head;

at least two oppositely disposed side wing assemblies, wherein the two side wing assemblies are detachably and rotatably connected to the connecting portions of the headrest, the side wing assemblies are configured to support both sides of the human head; and a fixing mechanism, wherein the fixing mechanism is detachably connected or fixedly connected to the headrest and configured to fix the headrest and the side wing assemblies to a vehicle seat;

wherein each of the side wing assemblies comprise a side wing, a first connecting mechanism, and a second connecting mechanism disposed on the side wing, wherein the first connecting mechanism comprises a support rod, the support rod is integrally an L-shaped structural body, a track hole is formed in the support rod in a length direction of the support rod, a limiting platform is disposed in the track hole, and first teeth are disposed on two opposite sides of the limiting platform.

2. The vehicle headrest with side wings according to claim 1, the side wing is rotatably connected to the second connecting mechanism and slidably connected to the first connecting mechanism through the second connecting mechanism.

3. The vehicle headrest with side wings according to claim 2, wherein the first connecting mechanism further comprises an insertion portion rotatably connected to the support rod, a first elastomer and a first button body that is disposed above the first elastomer are disposed in the insertion portion, the first elastomer is configured to reset the first button body by pressing, the first button body penetrates through a shell of the corresponding insertion portion and is in a protruding state, and a positioning boss is transversely disposed on a surface of the insertion portion.

4. The vehicle headrest with side wings according to claim 3, wherein each of the connecting portions is a tubular structural body, a snap-fit hole is formed in a position corresponding to the first button body on each of the connecting portions, a positioning groove adapted to the positioning boss is disposed on an inner wall of the snap-fit hole, and the side wing assemblies are quickly mounted and detached through cooperation of the first button body and the snap-fit hole.

5. The vehicle headrest with side wings according to claim 4, wherein the insertion portion further comprises a first damping mechanism, configured to generate a damping effect when the first connecting mechanism rotates.

6. The vehicle headrest with side wings according to claim 5, wherein the first damping mechanism comprises a bow-shaped member and a second elastomer disposed in the insertion portion, an insertion cavity is disposed at a position where the support rod and the insertion portion are connected, a plurality of damping grooves are formed in an inner ring of the insertion cavity, a damping platform extending into the damping grooves is disposed at a top of the bow-shaped member, the second elastomer is disposed below the bow-shaped member to elastically support the bow-shaped member, and when the damping platform of the bow-shaped member is snapped into the damping grooves, rotating positions of the side wing assemblies are in a locked state.

7. The vehicle headrest with side wings according to claim 6, wherein the second connecting mechanism comprises a pedestal, a rotating disc, and a second damping mechanism, the pedestal is embedded into the side wing, a rotating cavity is disposed inside the pedestal, the rotating disc is located in the rotating cavity, and the second damping mechanism is configured to generate a damping effect when the rotating disc rotates;

a top of the rotating disc extends upward to pass through the track hole in the support rod, a cover plate, a second button body, and a third elastomer are disposed at the top of the rotating disc, the third elastomer is located below the second button body and configured to reset the second button body by pressing, a top of the second button body penetrates through the cover plate, fourth teeth are disposed at positions corresponding to the first teeth on the second button body, and the first teeth are engaged with the fourth teeth; when the second button body is pressed, the fourth teeth on the second button body are away from the first teeth, in this case, the second connecting mechanism is in a sliding unlocking state, the second button body is loosened, and under a reset force of the third elastomer, the second button body is reset, and the first teeth are engaged with the fourth teeth to form a locked state of the second connecting mechanism.

8. The vehicle headrest with side wings according to claim 7, wherein the second damping mechanism comprises second teeth annularly disposed at a bottom of the rotating cavity and third teeth disposed on the rotating disc, and the third teeth and the second teeth are disposed opposite to each other and are engaged with each other.

9. The vehicle headrest with side wings according to claim 7, wherein the second damping mechanism comprises a plurality of limiting grooves and limiting posts annularly disposed at the bottom of the rotating cavity, and a fourth elastomer, the limiting posts are embedded into the rotating disc, the fourth elastomer is located below the limiting posts to elastically support the limiting posts, and when front ends of the limiting posts are snapped into the limiting grooves, the rotating position of the rotating disc is in a locked state.

10. The vehicle headrest with side wings according to claim 1, wherein the fixing mechanism comprises a housing, a left clamping arm and a right clamping arm that are slidably disposed on two opposite sides of the housing, and a hook rotationally connected to a rear end of the housing, a fixed cavity is disposed on the connecting bracket, a fixed seat is detachably connected in the fixed cavity, a horizontal bar is fixedly connected to or slidably connected front and back to the fixing mechanism, and a front end of the horizontal bar is rotationally connected to the fixed seat in the fixed cavity.

11. The vehicle headrest with side wings according to claim 10, wherein sliding groove bodies with a certain depth are formed in left and right sides of the housing of the fixing mechanism, the left clamping arm and the right clamping arm are both inserted into the corresponding sliding groove bodies and are detachably connected, and the left clamping arm and the right clamping arm are the same in structure.

12. The vehicle headrest with side wings according to claim 11, wherein the left clamping arm and the right clamping arm are both J-shaped structural bodies, the left clamping arm and the right clamping arm are disposed in a horizontal direction, and fifth teeth with a certain length are disposed on the left clamping arm and the right clamping arm in a length direction.

13. The vehicle headrest with side wings according to claim 12, wherein the fixing mechanism further comprises a third button body and a sixth elastomer disposed below the third button body, a top of the third button body penetrates through the corresponding housing and extends out of the housing, sixth teeth are disposed at positions corresponding to the fifth teeth on an upper surface of the third button body, the fifth teeth are engaged with the sixth teeth, and when the corresponding third button body is pressed, the sixth elastomer has compressive deformation, the sixth teeth on the third button body are separated from the fifth teeth, and the left clamping arm and the right clamping arm are in an unlocked state.

* * * * *